tion function; control means that controls generation of a

(12) United States Patent
Kobayashi

(10) Patent No.: US 10,372,632 B2
(45) Date of Patent: Aug. 6, 2019

(54) INFORMATION PROCESSING SYSTEM, INFORMATION PROCESSING METHOD AND INFORMATION PROCESSING DEVICE

(71) Applicant: NEC Corporation, Tokyo (JP)

(72) Inventor: Yoshikazu Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 117 days.

(21) Appl. No.: 15/527,554

(22) PCT Filed: Nov. 18, 2015

(86) PCT No.: PCT/JP2015/082361
§ 371 (c)(1),
(2) Date: May 17, 2017

(87) PCT Pub. No.: WO2016/080428
PCT Pub. Date: May 26, 2016

(65) Prior Publication Data
US 2017/0322892 A1    Nov. 9, 2017

(30) Foreign Application Priority Data

Nov. 19, 2014    (JP) .................................. 2014-235110

(51) Int. Cl.
*G06F 13/10*    (2006.01)
*G06F 9/455*    (2018.01)

(52) U.S. Cl.
CPC .......... *G06F 13/10* (2013.01); *G06F 9/45533* (2013.01)

(58) Field of Classification Search
None
See application file for complete search history.

(56) References Cited

U.S. PATENT DOCUMENTS

2001/0038385 A1* 11/2001 Negoi .................. G09G 3/36
                                                    345/204
2003/0227423 A1* 12/2003 Arai ................... G06F 3/04815
                                                    345/1.1
(Continued)

FOREIGN PATENT DOCUMENTS

JP    2001-325206    11/2001
JP    2007-318470    12/2007
(Continued)

OTHER PUBLICATIONS

Notification of Reasons for Refusal dated Mar. 6, 2018, by the Japanese Patent Office in counterpart Japanese Application No. 2016-560258.

(Continued)

*Primary Examiner* — Tuan C Dao
(74) *Attorney, Agent, or Firm* — Finnegan, Henderson, Farabow, Garrett & Dunner, L.L.P.

(57) ABSTRACT

The information processing system includes: a plurality of operation devices respectively connected to a plurality of communication terminals; operation integration means that inputs information about an operation on the plurality of operation devices; a display device that has a communication function; control means that controls generation of a screen related to information about an operation from the plurality of operation devices; and display control means that causes the display device to display the screen.

12 Claims, 34 Drawing Sheets

(56) References Cited

U.S. PATENT DOCUMENTS

| | | | | |
|---|---|---|---|---|
| 2005/0201406 | A1* | 9/2005 | Sekine | H04L 12/1881 370/432 |
| 2007/0091448 | A1* | 4/2007 | Durner | G02B 23/125 359/631 |
| 2007/0123243 | A1* | 5/2007 | Suito | H04M 11/007 455/419 |
| 2007/0217518 | A1* | 9/2007 | Valmiki | G06T 9/007 375/240.24 |
| 2007/0266093 | A1* | 11/2007 | Forstall | G06F 3/04817 709/204 |
| 2010/0295760 | A1* | 11/2010 | Somerville | G09G 3/3216 345/82 |
| 2011/0058036 | A1* | 3/2011 | Metzger | H04N 7/181 348/143 |
| 2015/0116447 | A1 | 4/2015 | Kobayashi | |
| 2015/0237099 | A1* | 8/2015 | Bai | H04L 65/602 709/231 |
| 2015/0355772 | A1* | 12/2015 | Hewitt | G06F 3/0416 345/173 |

FOREIGN PATENT DOCUMENTS

| | | |
|---|---|---|
| JP | 2008-210115 | 9/2008 |
| JP | 2011-23992 | 2/2011 |
| JP | 2013-200701 | 10/2013 |

OTHER PUBLICATIONS

International Search Report and Written Opinion dated Feb. 9, 2016, in corresponding PCT International Application.

* cited by examiner

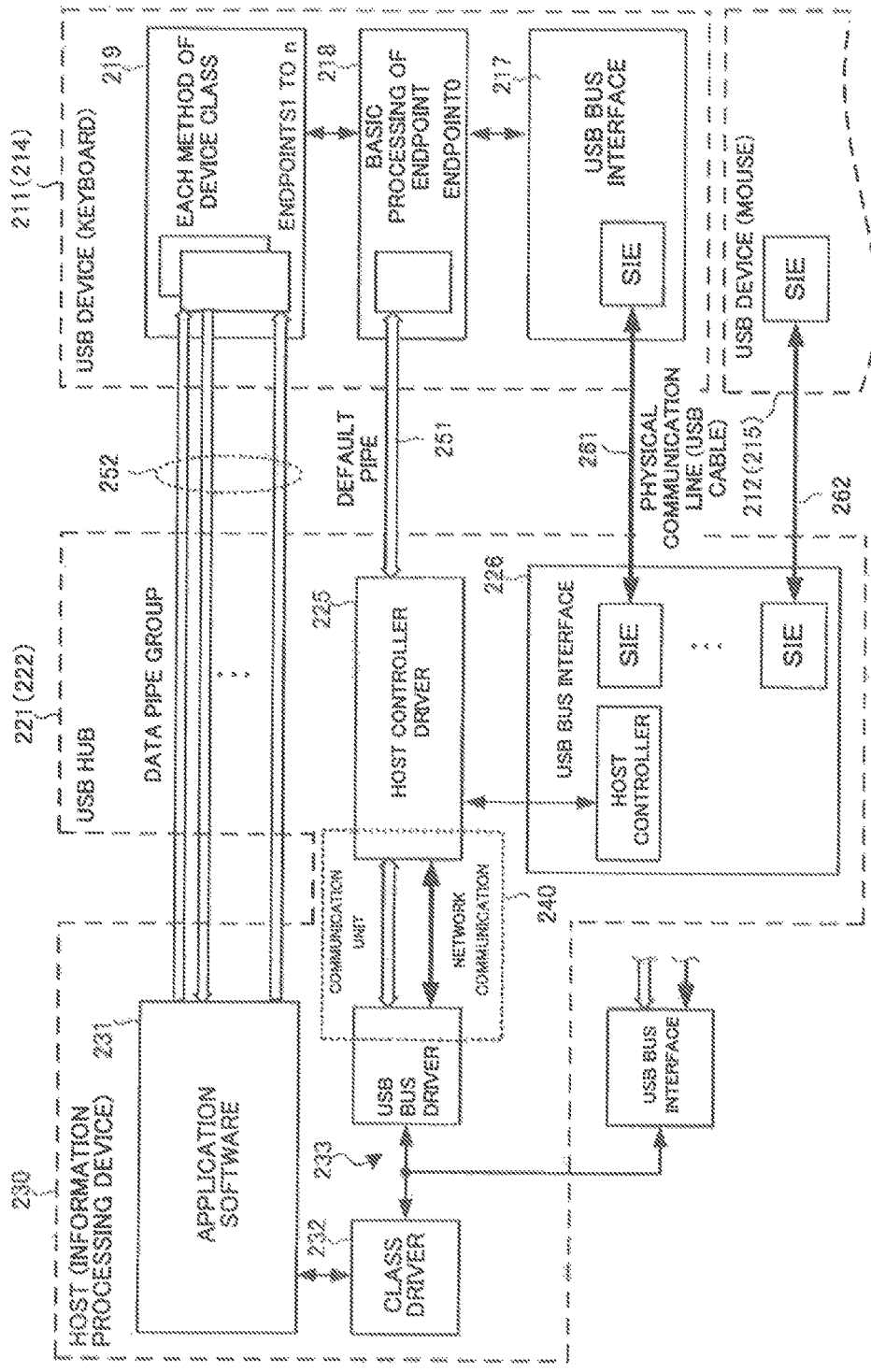

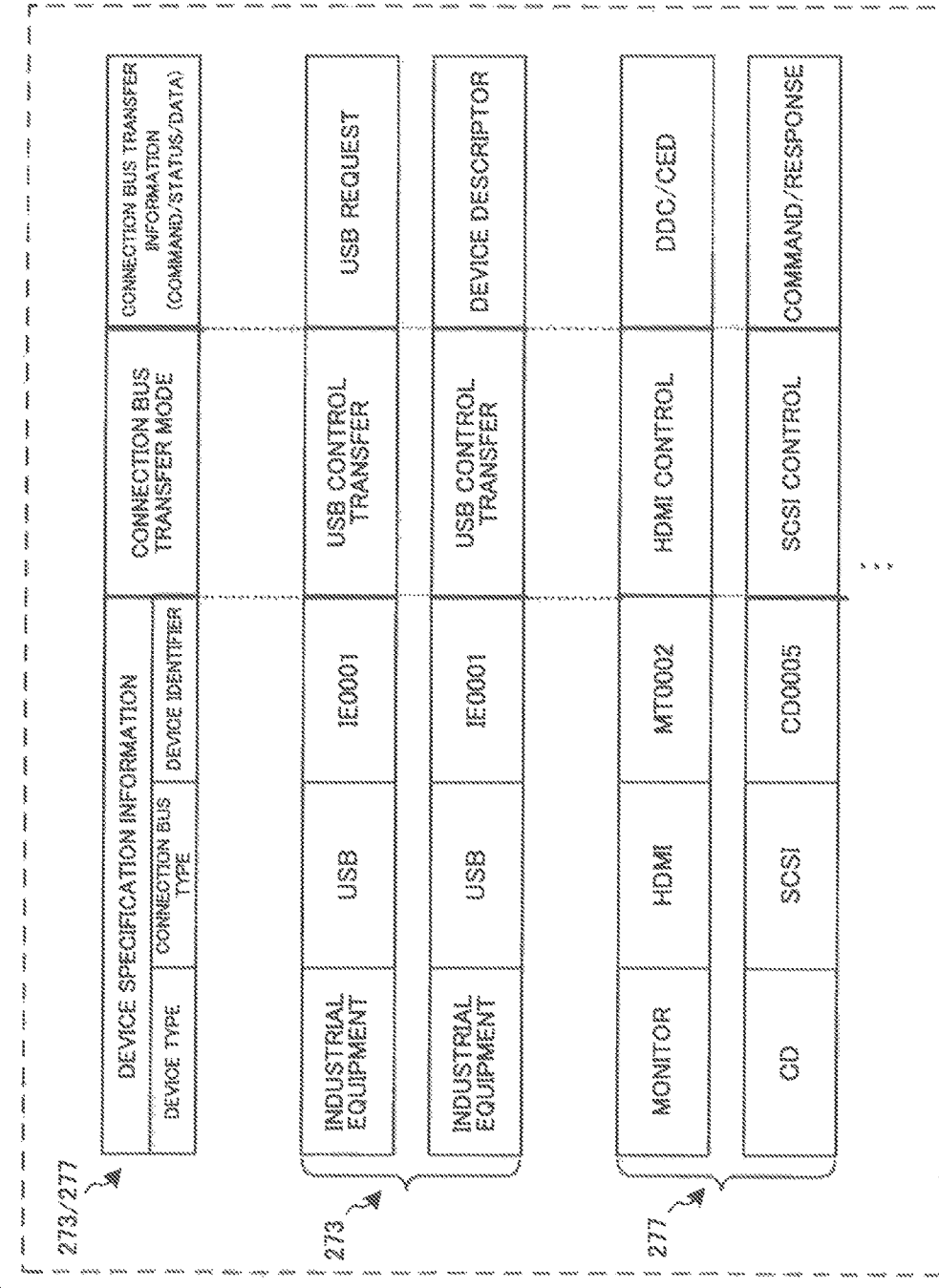

| SHARED DEVICE | CLASS DRIVER ID | VIRTUAL HUB | | VIRTUAL MONITOR DISTRIBUTOR | |
|---|---|---|---|---|---|
| | | USE | BUS DRIVER ID | USE | BUS DRIVER ID |
| KEYBOARD | | ○ | | × | |
| MOUSE | | ○ | | × | |
| MONITOR | | × | | ○ | |
| KEYBOARD | | ○ | | × | |
| MOUSE | | × | | ○ | |
| MONITOR | | | | | |
| ... | ... | | | | |

701  702  703  704

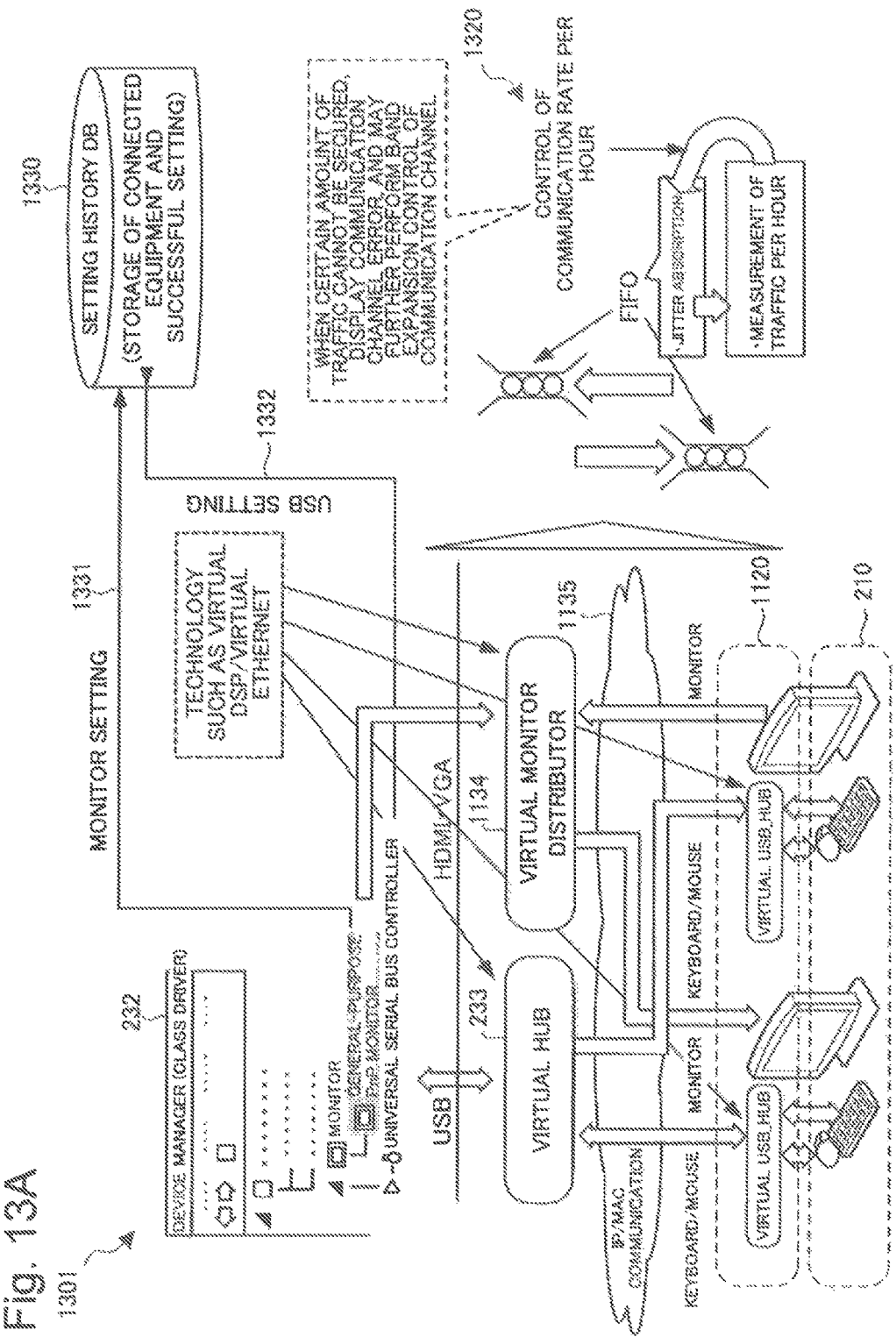

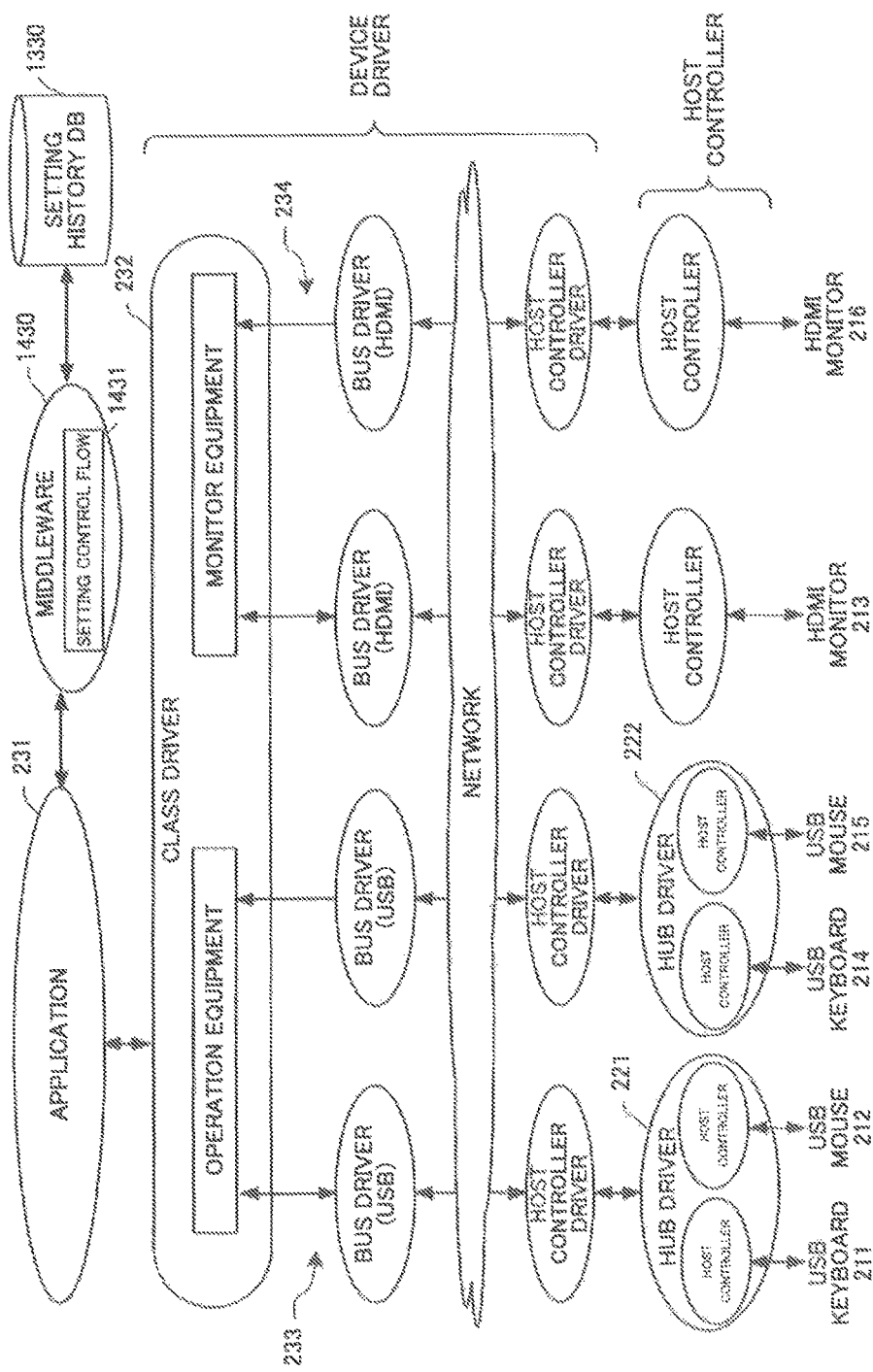

Fig. 15

| APPLICATION ID | OPERATION EQUIPMENT | | SCREEN-SHARING EQUIPMENT | | COMMUNICATION BUFFER | | EVALUATION VALUE |
|---|---|---|---|---|---|---|---|
| | EQUIPMENT TYPE | SHARING SETTING INFORMATION | EQUIPMENT TYPE | SHARING SETTING INFORMATION | SETTING LOCATION | CAPACITY | ... |
| | | | | | | | |
| | | | | | | | |
| ... | ... | | ... | | | | |

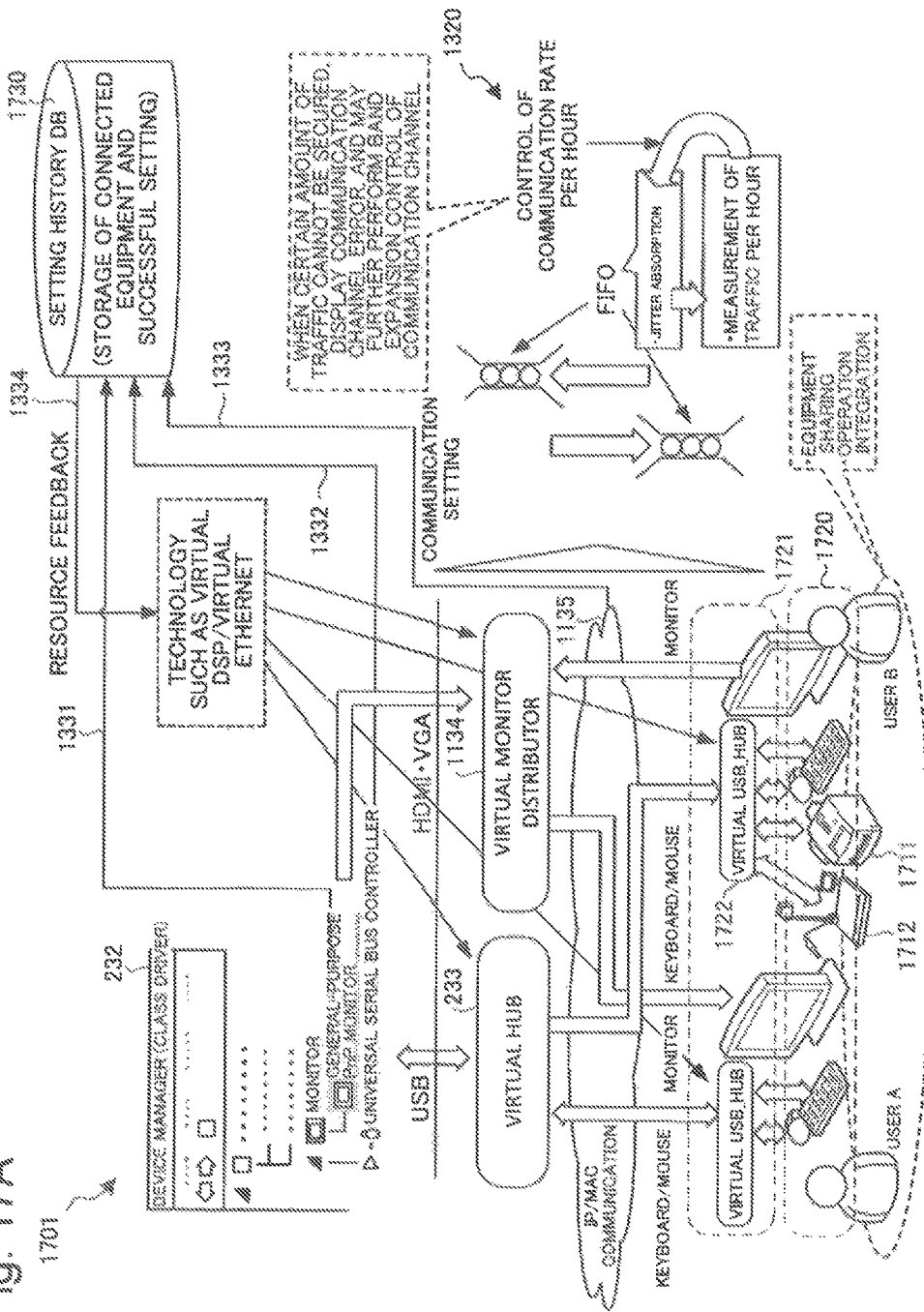

Fig. 18

| 1730 | 1501 | 1502 OPERATION EQUIPMENT | | 1503 SCREEN-SHARING EQUIPMENT | | 1706 OTHER TYPES OF SHARED EQUIPMENT | | 1704 COMMUNICATION BUFFER | | | 1707 | 1505 |
|---|---|---|---|---|---|---|---|---|---|---|---|---|
| | APPLICATION ID | EQUIPMENT TYPE | SHARING SETTING INFORMATION | EQUIPMENT TYPE | SHARING SETTING INFORMATION | EQUIPMENT TYPE | CONNECTION PATH | SETTING TYPE | SYNCHRONIZA-TION NECESSITY | CAPACITY | DATA COMPRES-SION RATIO | ... | EVALUA-TION VALUE |
| | | | | | | | | | | | | | |
| | | | | | | | | | | | | | |
| | | | | | | | | | | | | | |
| | | | | | | | | | | | | | |
| | ... | | | | | | | | | | | | |

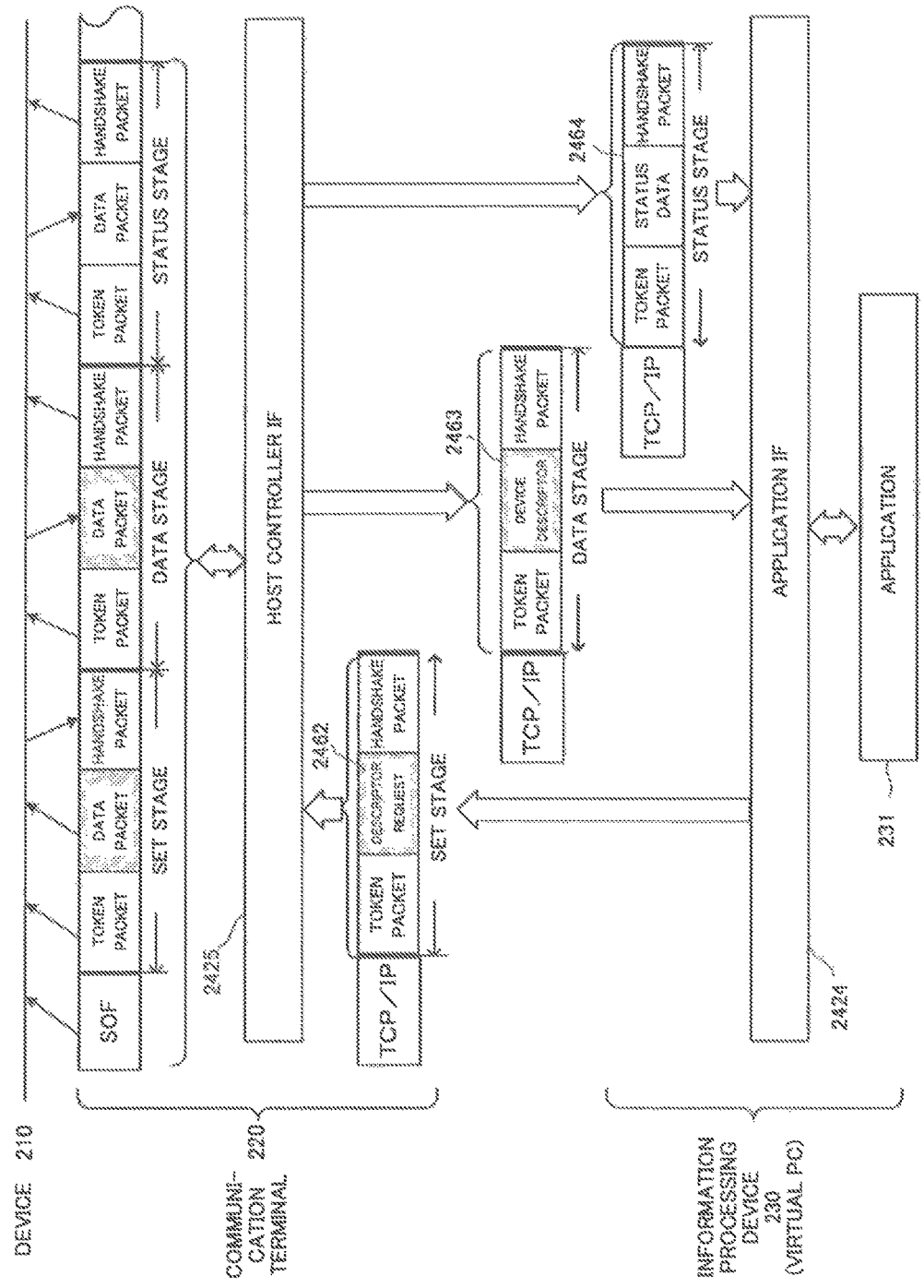

INFORMATION PROCESSING SYSTEM, INFORMATION PROCESSING METHOD AND INFORMATION PROCESSING DEVICE

CROSS-REFERENCE TO RELATED PATENT APPLICATIONS

This application is a National Stage Entry of International Application No. PCT/JP2015/082361, filed Nov. 18, 2015, which claims priority from Japanese Patent Application No. 2014-235110, filed Nov. 19, 2014. The entire contents of the above-referenced applications are expressly incorporated herein by reference.

TECHNICAL FIELD

The present invention relates to an information processing system, an information processing method, an information processing device, and a control method and a control program therefor.

BACKGROUND ART

In the aforementioned technological field, PTL 1 discloses a technology of controlling a device USB-bus-connected to a local terminal from a remote computer in a same manner as a device USB-hub-connected to the computer. The above is performed by providing a pseudo device driver and a pseudo core driver.

CITATION LIST

Patent Literature

PTL 1: Japanese Unexamined Patent Application Publication No. 2008-210115

SUMMARY OF INVENTION

Technical Problem

However, the technology described in the aforementioned literature is configured to act as proxy by providing a pseudo device driver and a pseudo core driver. Accordingly, the technology is not able to integrate operations on a plurality of remote operation devices while sharing a screen on a remote display device.

An object of the present invention is to provide a technology solving the aforementioned problem.

Solution to Problem

To achieve the above objective, an information processing system of the present invention includes:

a plurality of operation devices respectively connected to a plurality of communication terminals;

operation integration means that inputs information about an operation on the plurality of operation devices;

a display device that has a communication function;

control means that controls generation of a screen related to information about an operation from, the plurality of operation devices; and display control means that causes the display device to display the screen.

To achieve the above objective, an information processing method of the present invention includes:

an operation integration step of inputting information about an operation on a plurality of operation devices respectively connected to a plurality of communication terminals;

a control step of controlling generation of a screen related to information about an operation from the plurality of operation devices; and a display control step of causing the display device having a communication function to display the screen.

To achieve the above objective, an information processing device of the present invention includes:

operation integration means that receives information about an operation on a plurality of operation devices respectively connected to a plurality of communication terminals;

control means that controls generation of a screen related to information about an operation from, the plurality of operation devices; and display control means that causes the display device having a communication function to display the screen.

To achieve the above objective, a control method for an information processing device of the present invention includes:

an operation integration step of receiving information about an operation on a plurality of operation devices respectively connected to a plurality of communication terminals;

a control step of controlling generation of a screen related to information about an operation from the plurality of operation devices; and a display control step of causing a display device having a communication function to display the screen.

To achieve the above objective, a control program for an information processing device of the present invention causes a computer to perform:

an operation integration step of receiving information about an operation on a plurality of operation devices respectively connected to a plurality of communication terminals;

a control step of controlling generation of a screen related to information about an operation from the plurality of operation devices; and a display control step of causing a display device having a communication function to display the screen.

Advantageous Effects of Invention

The present invention is able to integrate operations of a plurality of remote operation devices while sharing a screen on a remote display device.

BRIEF DESCRIPTION OF DRAWINGS

FIG. 2C is a diagram illustrating a concept of USB hub connection according to the second example embodiment of the present invention.

FIG. 2F is a diagram illustrating a communication, data structure according to the second example embodiment of the present invention.

FIG. 7 is a diagram illustrating a structure of a shared device registration table according to the second example embodiment of the present invention.

FIG. 13A is a block diagram illustrating a configuration of an information processing system according to a fourth example embodiment of the present invention.

FIG. 14 is a diagram illustrating a software configuration of the information processing system according to the fourth example embodiment of the present invention.

FIG. 15 is a diagram illustrating a structure of a setting history database according to the fourth example embodiment of the present invention.

FIG. 17A is a block diagram illustrating a configuration of an information processing system according to a fifth example embodiment of the present invention.

FIG. 18 is a diagram illustrating a structure of a workflow database according to the fifth example embodiment of the present invention.

FIG. 24 is a diagram illustrating another type of data transmission in the information processing system according to the seventh example embodiment of the present invention.

DESCRIPTION OF EMBODIMENTS

Figure 1:
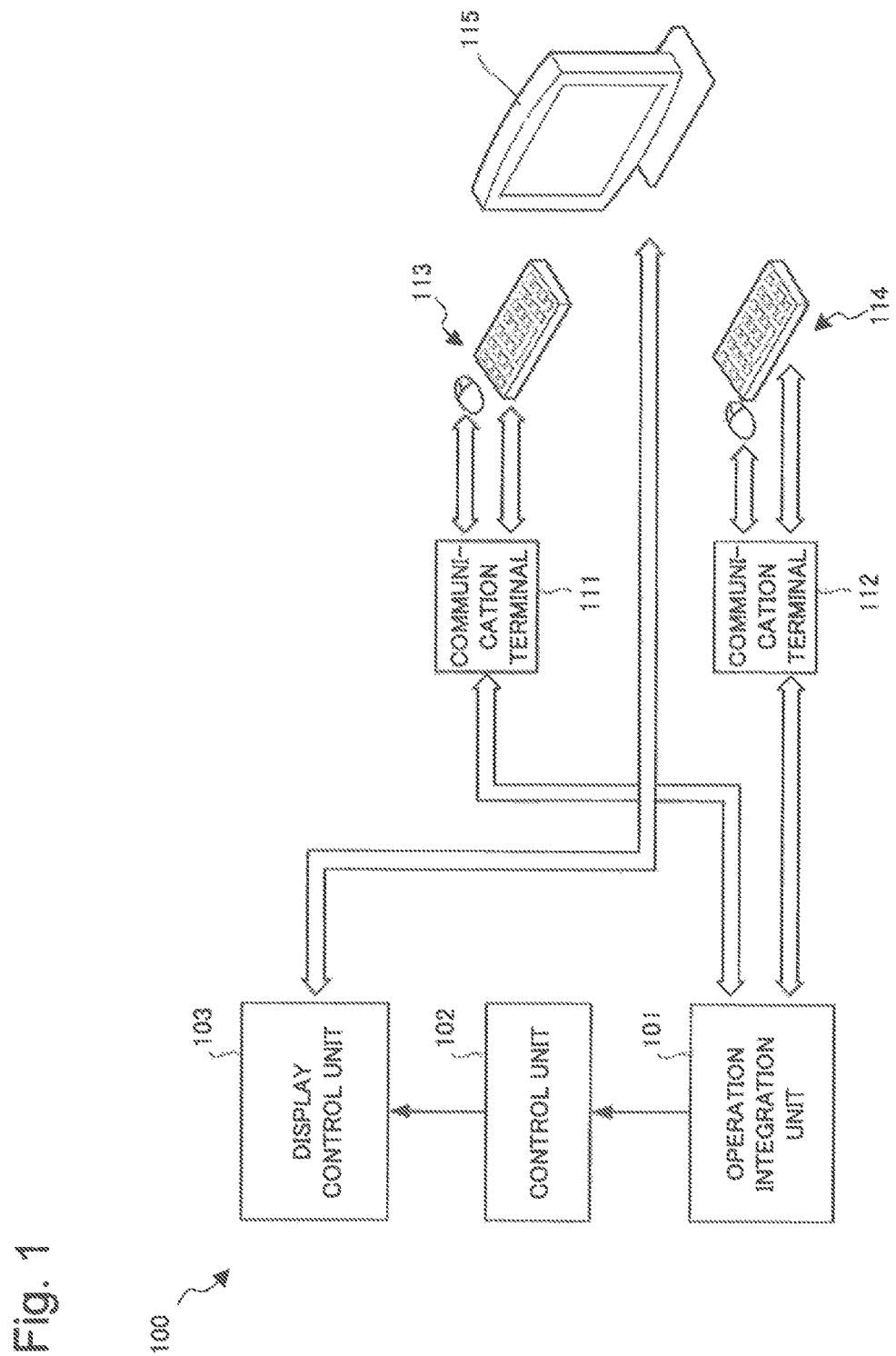
FIG. 1 is a block diagram illustrating a configuration of an information processing system according to a first example embodiment of the present invention.

Referring to the drawings, example embodiments of the present invention will be exemplarily described in detail. However, components described in the following example embodiments are merely exemplifications and are not intended to limit the technical scope of the present invention thereto.

First Example Embodiment

An information processing system 100 according to a first example embodiment will be described by use of FIG. 1. The information processing system 100 is a system integrating operations of devices and sharing a display.

As illustrated in FIG. 1, the information processing system 100 includes a plurality of operation devices 113 and 114, an operation integration unit 101, a display device 115 having a communication function, a control unit 102, and a display control unit 103. The plurality of operation devices 113 and 114 are respectively connected to a plurality of communication terminals 111 and 112. The operation integration unit 101 inputs information about an operation on the plurality of operation devices 113 and 114. The control unit 102 accommodates operation information from the plurality of operation devices 113 and 114. The display control unit 103 causes the display device 115 to display a screen.

The present example embodiment is able to integrate operations of a plurality of remote operation devices while sharing a screen on a remote display device.

Second Example Embodiment

Next, an information processing system according to a second example embodiment will foe described. The information processing system according to the present example embodiment performs operation integration in a remote operation device and a remote display device that are connected to a personal computer (PC) through communication. For example, the remote operation device includes a keyboard and a pointing device that are universal serial bus (USB)-connected to a communication terminal. Further, the remote display device may include a High-Definition Multimedia Interface (HDMI) (registered trademark)-connected monitor having a communication function, or a display screen of a smartphone or a tablet.

<<Information Processing System>>

Before describing the information processing system according to the present example embodiment, an information processing system according to an underlying technology will be described in order to clarify a feature of the present example embodiment.

(Underlying Technology)

Figure 4A:
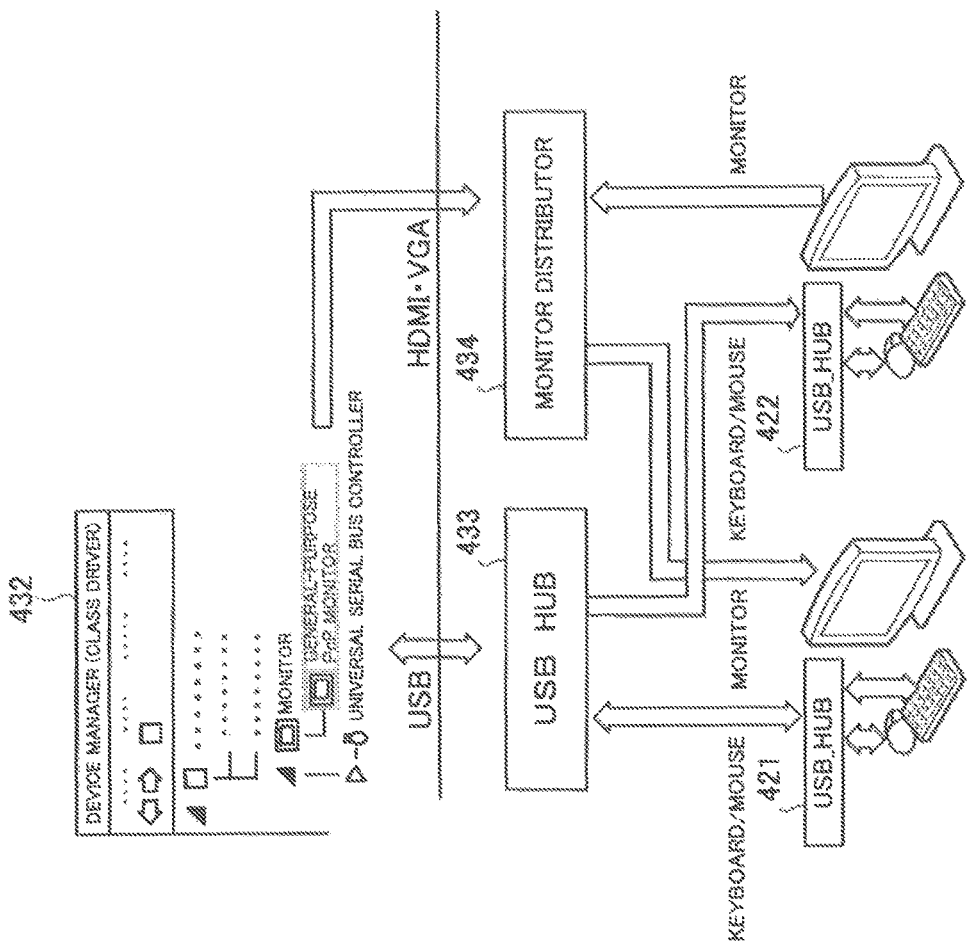
FIG. 4A is a diagram illustrating a concept of an information processing system according to an underlying technology.

FIG. 4A is a diagram illustrating a concept of an information processing system 400 according to the underlying technology.

The information processing system 400 in FIG. 4A controls device connection by USB, HDMI (registered trademark), VGA, or the like, by a device driver including a class driver 432 in a PC. Then, the system provides a USB HUB 433 for integration of operation equipment, and a monitor distributor 434 for sharing display equipment (monitor), on the equipment side of the device driver. Respectively distributed buses are connected to a plurality of pieces of operation equipment and monitors to provide equipment sharing. In order to connect a keyboard and a mouse as operation equipment, USB_HUBs 421 and 422 are connected beyond USB for distribution.

Thus, the shared equipment in FIG. 4A is limited by an allowable distance of the bus. Further, a remote desktop and virtualization of a desktop (Desktop-as-a-Service [DaaS]) are not able to perform operation integration. Further, screen sharing in a TV conference does not share a PC to prepare a material by operation integration.

Figure 4B:
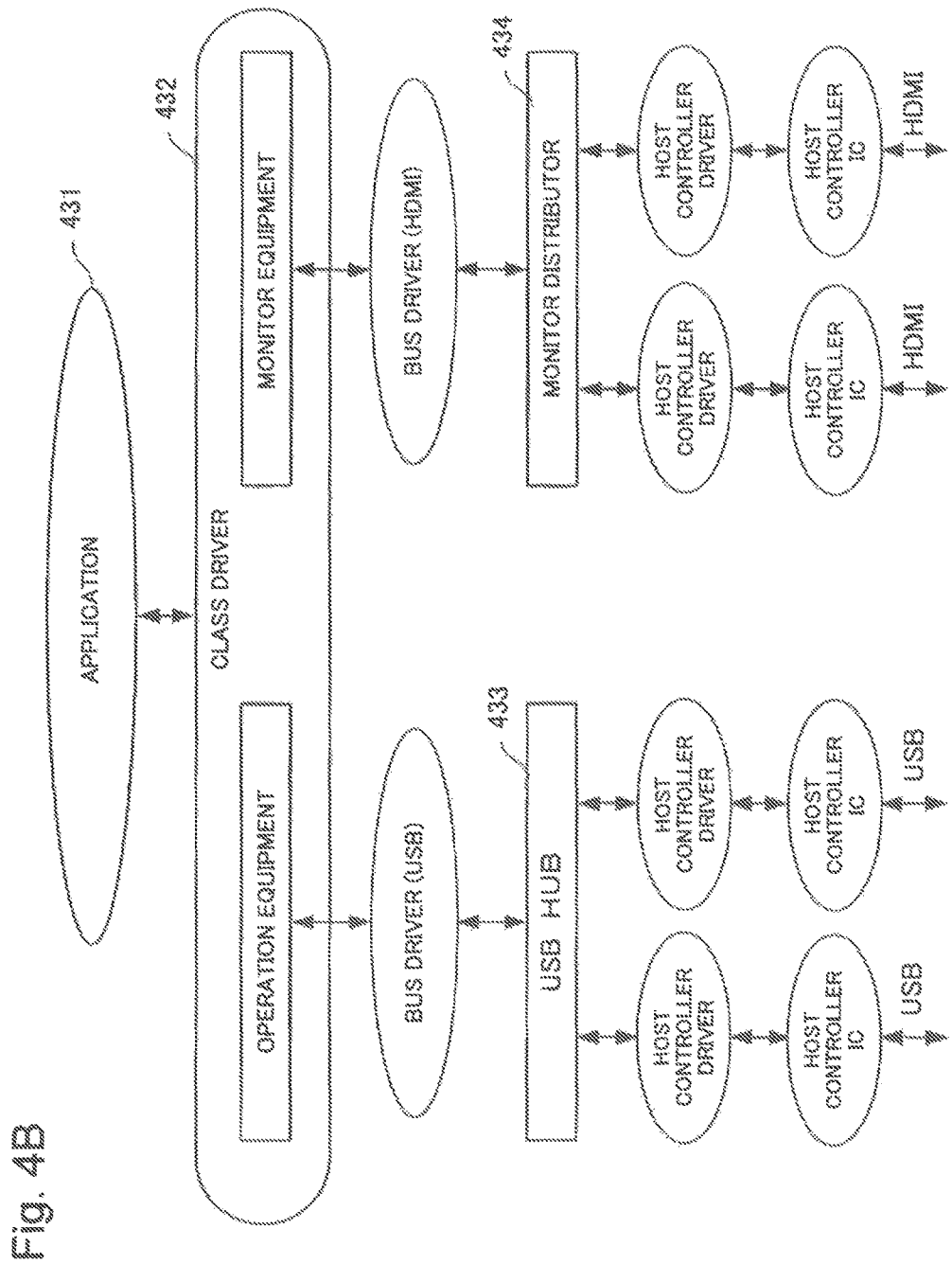
FIG. 4B is a diagram illustrating a software configuration of the information processing system according to the underlying technology.

FIG. 4B is a diagram illustrating a software configuration of the information processing system 400 according to the underlying technology.

In FIG. 4B, when an input-output instruction is issued from an activated application 431 to peripheral equipment, a different protocol is selected in a class driver 432 in accordance with a device type. Next, a protocol specific to USB or HDMI (registered trademark) is selected in each bus driver.

A signal conforming to the bus driver protocol is distributed by a USB_HUB 433 or a monitor distributor 434 and controls a host controller driver. The host controller driver controls serial communication over each physical bus by a host controller IC.

Three layers composed of the class driver 432, the bus driver, and the host controller driver constitute a typical device driver.

Thus, in the underlying technology, a PC screen of a user is virtualized for remote use by the user, or, a PC screen of a user is projected on a plurality of screens by conference software. Accordingly, there is no idea of sharing an application in real time by remote equipment for simplified operation integration.

<<Information Processing System According to Present Example Embodiment>>

The information processing system according to the present example embodiment easily provides equipment sharing and operation integration by connecting peripheral equipment at a remote location, advancing from a state in the case of the underlying technology. In the case of the underlying technology, equipment sharing and operation integration are performed by a PC at hand within a range of connectivity through a physical USB_HUB and a monitor distributor.

(System Configuration)

Figure 2A:
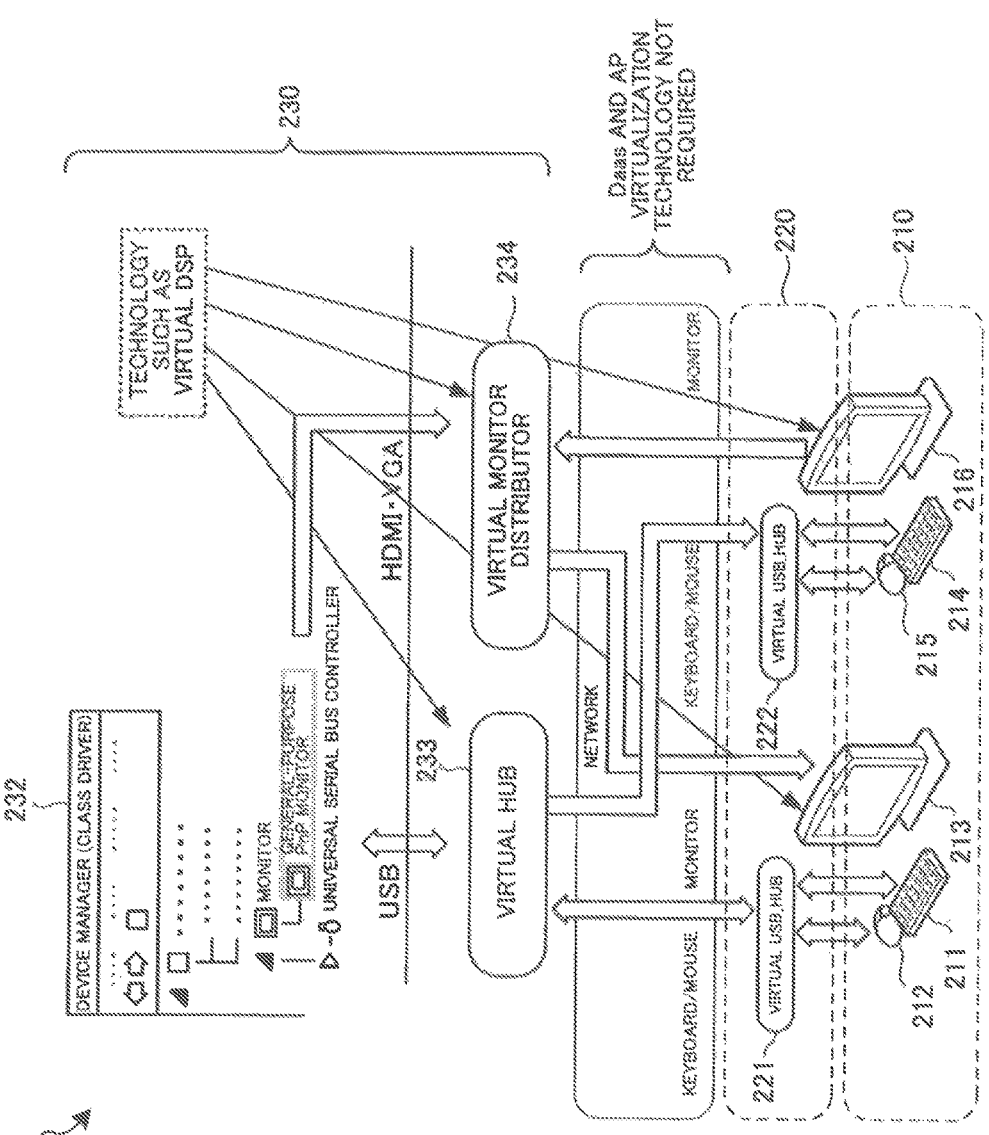
FIG. 2A is a block diagram illustrating a configuration of an information processing system according to a second example embodiment of the present invention.

FIG. 2A is a block diagram illustrating a configuration of an information processing system 200 according to the present example embodiment.

The information processing system 200 in FIG. 2A controls device connection by USB, HDMI (registered trademark), VGA, or the like by a PC as an information processing device 230, a class driver 232 (operating as a device manager), and a bus driver. The class driver 232 and the bus driver are configured to serve as a virtual HUB 233 or a virtual monitor distributor 234.

Each message distributed by the virtual HUB 233 or the virtual monitor distributor 234 is transmitted to and from a host controller driver on a remote communication terminal or a communication function unit 220 through a network. In order to connect a keyboard and a mouse as operation equipment, virtual USB_HUBs 221 and 222 are provided to a communication terminal 220 for distribution.

For example, keyboards 211 and 214, mice 212 and 215, and monitors 213 and 216 having a communication function are connected as devices 210, each providing operation integration or display sharing.

While FIG. 2A illustrates a configuration of screen sharing by two monitors, a plurality of sets of operation integration (keyboards and mice) may be performed with one monitor being viewed.

(Software Configuration)

Figure 2B:
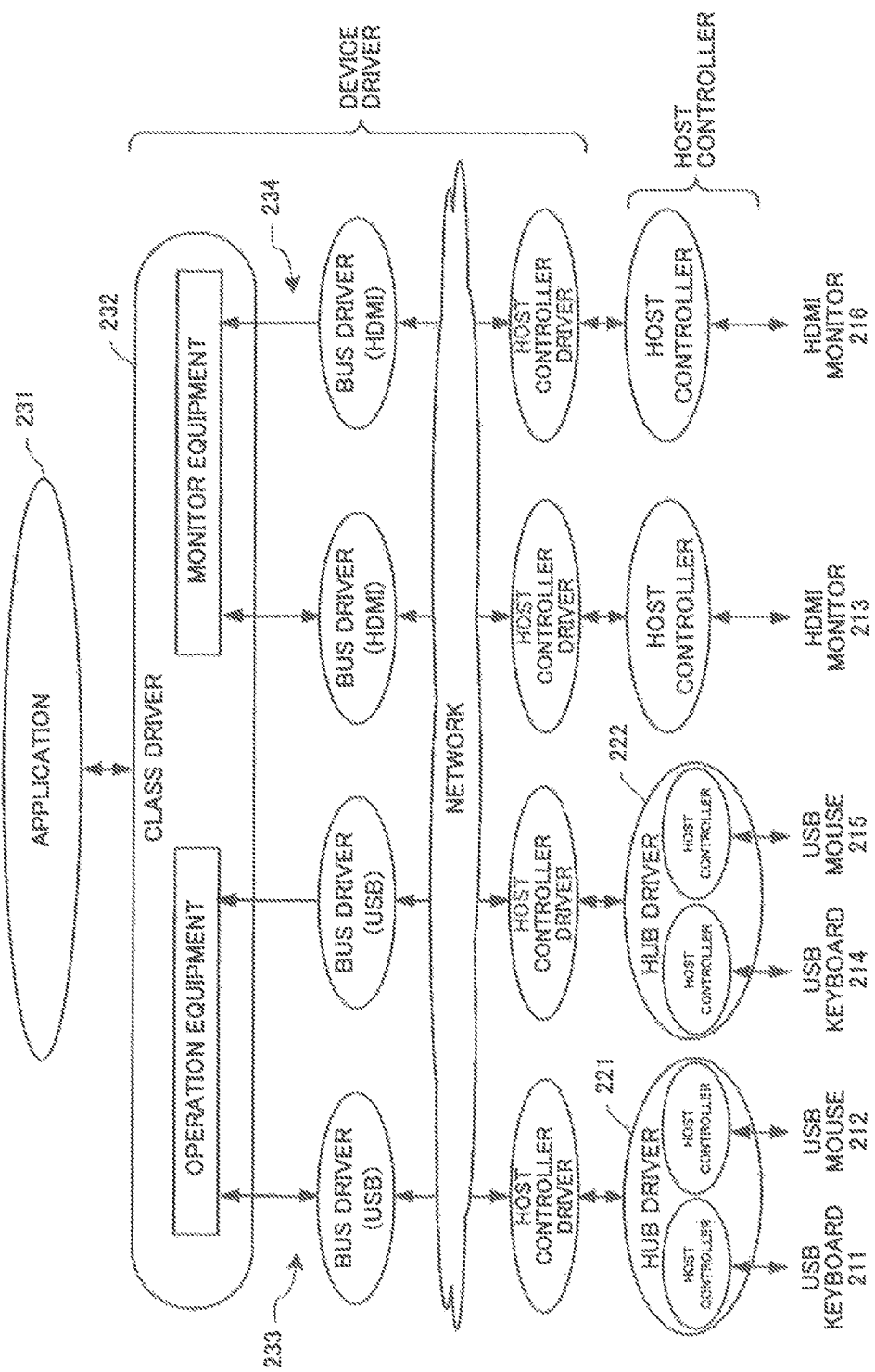
FIG. 2B is a diagram illustrating a software configuration of the information processing system according to the second example embodiment of the present invention.

FIG. 2B is a diagram illustrating a software configuration of the information processing system 200 according to the present example embodiment.

In FIG. 2B, when an input-output instruction is issued from an activated application 231 to peripheral equipment, a different protocol is selected in the class driver 232 in accordance with a device type. Next, a protocol specific to USB or HDMI (registered trademark) is selected in each bus driver. By activating a plurality of bus drivers related to bus branching for the respective different protocols in the class driver 232, each bus driver operates as a virtual HUB 233 or a virtual monitor distributor 234.

In a communication terminal or a communication function unit, a host controller driver corresponding to each bus driver is activated through the network. Three layers composed of the class driver 232, the bus driver, and the host controller driver constitute a typical device driver, and therefore the device driver is divided by the network communication. The connection between the bus driver and the host controller driver, according to the present example embodiment, is remotely extended by communication. However, division by communication may be placed between other drivers or within another driver, which efficiently provides remote device control and communication control.

In the host controller for bus-connecting each device, the virtual USB_HUBs 221 and 222 are configured by a hub driver being distributed to a plurality of host controllers. The devices 211 to 216 bus connected to the host controller are similar to those in FIG. 2A.

Thus, the information processing system according to the present example embodiment easily provides equipment sharing and operation integration. The above is achieved by connecting peripheral equipment at a remote location by a software-based operation and functional partitioning.

<<Concept of USB Hub Connection>>

FIG. 2C is a diagram illustrating a concept of USB hub connection according to the present example embodiment.

Note that, in FIG. 2B, illustration of regular software such as an operating system (OS) and a basic input/output system (BIOS) is omitted.

FIG. 2C illustrates the host 230 as an information processing device, the remote USB hub 221 (222) connected to the host 230 through a network 240, and a plurality of the USB devices 211 and 212 (214 and 215).

The host 230 includes, as software, the application software 231, the class driver 232 as part of a device driver, and a plurality of USB bus drivers relating to operation equipment and being distributed from the class driver 232. The plurality of USB bus drivers distributed from the class driver 232 constitute the virtual HUB 233.

The application software 231 is software for providing a service previously provided by the host 230, or a service developed by a user. The class driver 232 interprets an input-output file operation requested by the application software 231, and selects a protocol related to a target device. Since this example handles access to an input-output file in the USB devices 211 and 212, the class driver 232 prepares transmission and reception of data complying with a command and a data format that conform to a USB protocol. That is to say, the class driver 232 generates a structure defining control information and data that are transmitted and received through the network 240. The plurality of bus drivers are respectively connected to host controller drivers 225 in the plurality of USB hubs 221 and 222 through a communication unit 240.

The USB hub 221 (222) includes the host controller driver 225 and a USB bus interface 226 branching into a plurality of SIEs. The host controller driver 225 has a function for branching into a plurality of USB cables. Further, the respective plurality of SIEs are connected to respective SIEs in the plurality of USB devices 211 and 212 through a plurality of USB cables 261 and 262.

The USB device (keyboard) 211 includes, as software, a USB bus interface 217 in the USB device 211 that connects with the USB bus interface 226 in the USB hub 221 through the USB cable 261 and exchanges a signal with the USB bus interface 226. Further, the USB device 211 includes an endpoint0 218 composed of a first-in first-out (FIFO)0 that stores a descriptor including device information and control information, and endpoints 1 to n 219 composed of FIFO1 to n that store input-output data.

By such connection, the USB hub 221 and the USB device 211 (212) perform physical-level communication by the own USB bus interfaces 226 and 217. Further, by a system-level control transfer through the class driver 232, the USB bus driver, the network 240, and the host controller driver 225, control communication as basic processing is provided between the application software 231 and the endpoint0 (218) through a default pipe 251. Further, in an application-level data transfer, data communication as each method of a device class is provided between the application software 231 and the endpoints1 to n (219) through a data pipe group 252.

As described above, a unified communication channel (pipe) can be formed by network communication between the bus driver in the host 230 and the host controller driver 225 in the USB hub 221 through the network 240, and serial communication between the USB bus interfaces 226 and 217 through the USB cable.

Processing between the USB interface 226 and the USB device (mouse) 212 is similar except for a device type, and therefore description thereof is omitted.

(Information Flow)

Figure 2D:
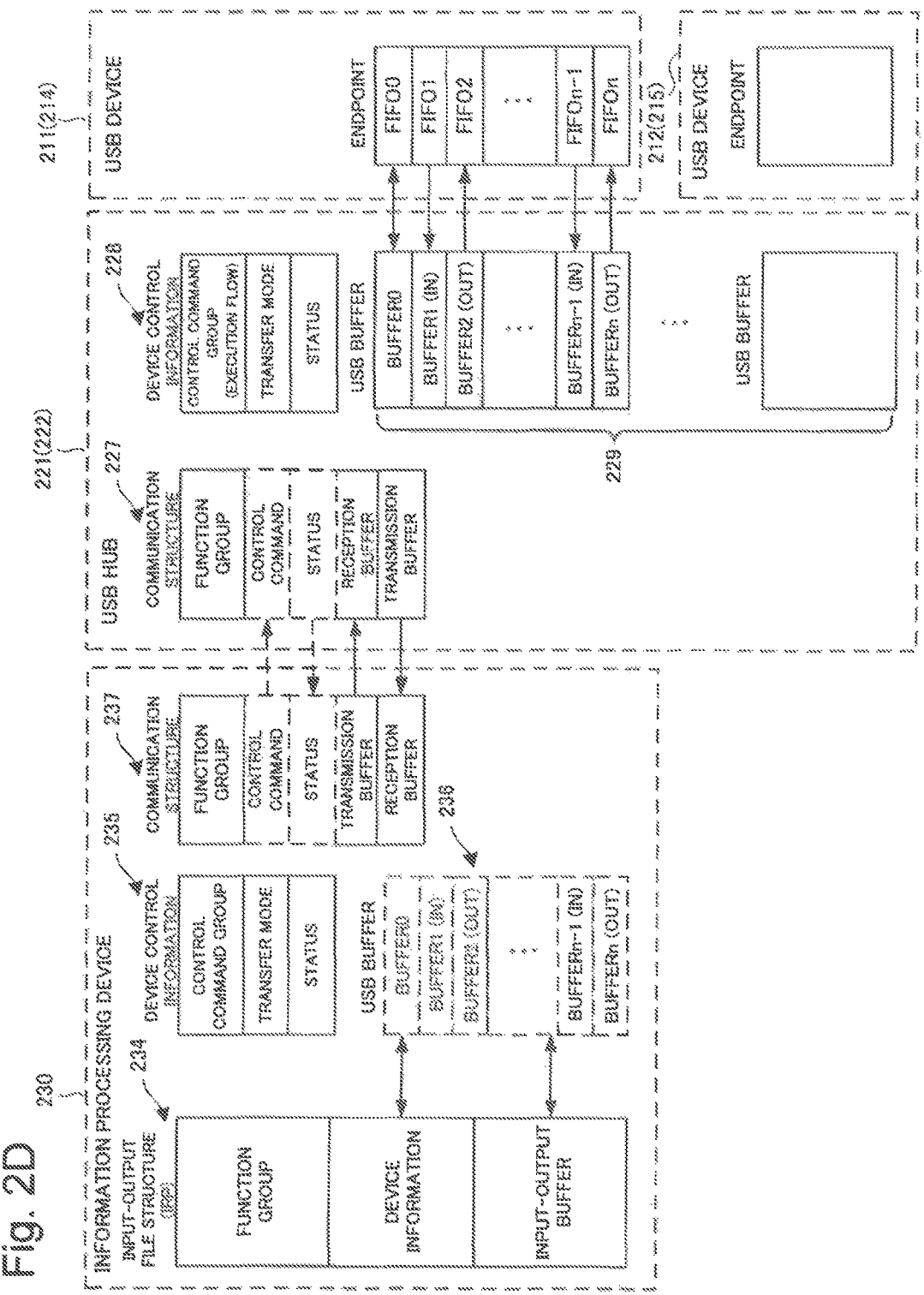
FIG. 2D is a diagram illustrating an information flow in the USB hub connection according to the second example embodiment of the present invention.

FIG. 2D is a diagram illustrating au information flow in the USB hub connection according to the present example embodiment. Note that FIG. 2D illustrates main storage areas, and a detailed configuration is omitted. FIG. 2D illustrates au example that processing of a host controller driver in a device driver is separated between the information processing device 230 as a host and the remote USB hub 221 through communication, so that the information processing device 230 apparently controls the USB device 211 (212) through direct connection. However, it is desirable to select a layer in which the device driver is separated, in accordance with performance of the information processing device 230 and the USB hub 221, and a communication environment.

An input-output file structure 234, device control information 235, a USB buffer 236, and a communication structure 237 are secured in the information processing device 230. The input-output file structure 234 is secured when the application software 231 instructs an input-output file operation. Further, for example, the input-output file structure 234 includes a function group performing predetermined processing in accordance with a file storage destination, a device type, an input-output protocol, and the like, device information, and an input-output buffer. Device control information 235 includes a transmitted and received control command group, a current transfer mode, and status. The control command group includes control commands for controlling a setting related to communication, an action against a communication error, and the like, in addition to control commands for controlling input and output from and to the USB device. The device control information 235 may be integrated into the device information in the input-output file structure 234. The USB buffer 236 includes a buffer corresponding to each endpoint secured by the class driver 232 and the bus driver in accordance with processing by the function group in the input-output file structure 234, when a device type is a USB device. The communication structure 237 is a structure secured by the class driver 232 and the bus driver in accordance with processing by the function group in the input-output file structure 234, when a device is at a remote location through the network. The communication structure 237 includes a function group for setting a protocol and a message format that are related to communication, a communication rate, and the like, a control command to be transmitted, and received status. The communication structure 237 further includes a transmission buffer temporarily storing transmitted data, and a reception buffer temporarily storing received data. The USB buffer 236 is optional. Data transfer may be directly performed between the input-output buffer in the input-output file structure 234, and the transmission buffer and the reception buffer in the communication structure 237. Further, as long as a layer in which the device driver is separated by communication is a higher layer, a control command and status need not be communicated independently, and may be included in transmitted and received data.

A communication structure 227, device control information 228, and a USB buffer 229 are secured in the USB hub 221. The communication structure 227 is a structure associated with the communication structure 237 secured by the application software 231. The communication structure 227 includes a function group for setting a protocol and a message format related to communication, a communication rate, and the like, a received control command, and status to be transmitted. The communication structure 227 further includes a reception buffer temporarily storing received data, and a transmission buffer temporarily storing transmitted data. The device control information 228 includes a transmitted and received control command group, a current transfer mode, and status. Each control command in the control command group is associated with a control flow converting the control command into a USB command string executing the control command. Further, the control command group includes control commands for controlling a setting related to communication, an action against a communication error, and the like, in addition to control commands for controlling input and output from and to the USB device. The USB buffer 229 includes a buffer being secured when a device type is a USB device and corresponding to each endpoint in the USB device 211 (212).

FIFOs0 to n are prepared as endpoints in the USB device 211 (212), in accordance with a device type.

(Communication Message)

Figure 2E:
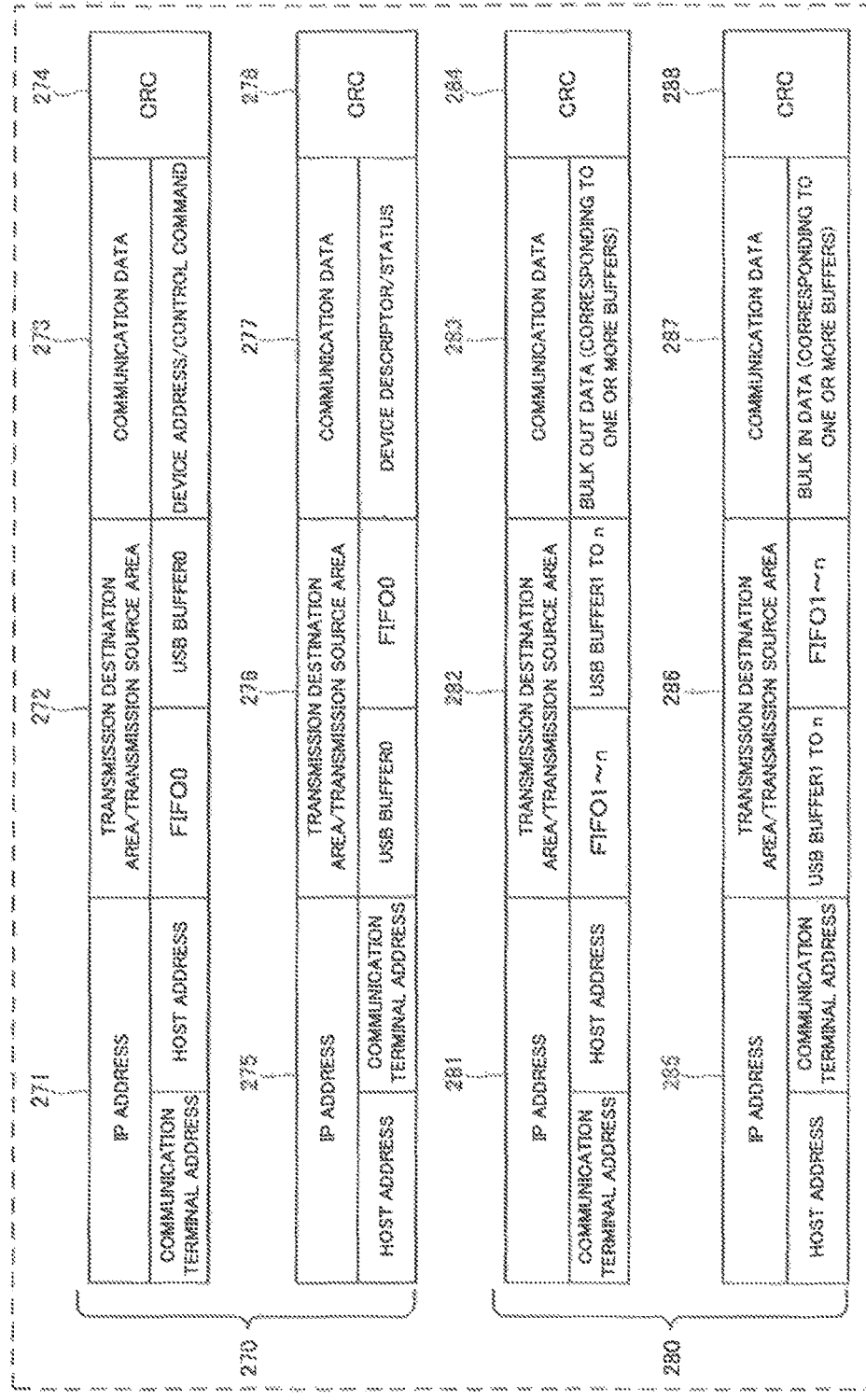
FIG. 2E is a diagram illustrating a structure of a communication message according to the second example embodiment of the present invention.

FIG. 2E is a diagram illustrating a structure of a communication message according to the present example embodiment. Note that the format of the communication message is not limited to FIG. 2E.

FIG. 2E illustrates control messages 270 transmitted and received over a control channel being the default pipe 251, and data messages 280 transmitted and received over a data channel being the data pipe group 252.

Out of the control messages 270, a control message transmitted from the host 230 to the USB hub 221 composed of a communication terminal includes an IF address 271 and a transmission destination area/transmission source area 272. The control message further includes communication data 273 and, for example, a CRC 274 for error correction. As the IF address 271, a communication terminal address of a destination and a host address of a source are set. As the transmission destination area/transmission source area 272, a FIFO0 in the USB device 211 (212) is designated in the transmission destination area, and a USB buffer0 in the host 230 is designated in the transmission source area. Further, as the communication data 273, a device address assigned by the host 230 and a control command of the USB device 211 (212) are transmitted.

Out of the control messages 270, a control message transmitted from the USB hub 221 composed of a communication terminal to the host 230 includes an IF address 275 and a transmission destination area/transmission source area 276. The control message further includes communication data 277 and, for example, a CRC 278 for error correction. As the IF address 275, a host address of a destination and a communication terminal address of a source are set. As the transmission destination area/transmission source area 276, the USB buffer0 in the host 230 is designated in the transmission destination area, and the FIFO0 in the USB device 211 (212) is designated in the transmission source area. Further, as the communication data 277, a device descriptor and device status of the USB device 211 (212) are transmitted.

Out of the data messages 280, a data message transmitted from the host 230 to the USB hub 221 composed of a communication terminal includes an IP address 281 and a transmission destination area/transmission source area 282. The data message further includes communication data 283 and, for example, a CRC 284 for error correction. As the IP address 281, a communication terminal address of a destination and a host address of a source are set. As the transmission destination area/transmission source area 282, FIFOs1 to n in the USB device 210 are designated in the transmission destination area, and USB buffers1 to n in the host 230 are designated in the transmission source area, in a mutually associated manner. Further, as the communication data 283, one or more pieces of bulk OUT data are transmitted.

Out of the data messages 280, a data message transmitted from the USB hub 221 composed of a communication terminal to the host 230 includes an IP address 285 and a transmission destination area/transmission, source area 286. The data message further includes communication data 287 and, for example, a CRC 288 for error correction. As the IP address 285, a host address of a destination and a communication terminal address of a source are set. As the transmission destination area/transmission source area 286, the USB buffers1 to n in the host 230 are designated in the transmission destination area, and the FIFOs1 to n in the USB device 210 are designated in the transmission source area, in a mutually associated manner. Further, as the communication data 287, one or more pieces of bulk IN data are transmitted.

While other transfer types include an interrupt transfer and an isochronous transfer, in addition to the control transfer and the bulk transfer, the other transfer types include similar data message structures except that the "SETUP" stage is omitted. Accordingly, description of the messages thereof is omitted.

Network communication is performed between the host 230 and the USB hub 221 composed of a communication terminal in terms of encapsulated IP addresses. Meanwhile, data are transmitted between a USB buffer secured in the host 230 by the application software 231, and a FIFO being an endpoint in the USB device 211 (212).

(Communication Data Structure Example)

FIG. 2F is a diagram illustrating a communication data structure according to the present example embodiment. Note that, in FIG. 2F, an IP address for encapsulation and the like in FIG. 2E are omitted. While FIG. 2F illustrates an example of a communication data structure providing the present example embodiment, the structure is not limited thereto. For example, as communication data in an upper layer of a device driver, a parameter (argument) of a function may be transmitted and received, or the function itself may be transmitted and received.

FIG. 2F illustrates a basic communication data structure 273/277, a communication data structure 273 in a case of USB, and a communication data structure 277 in a case of other interface types being HDMI (registered trademark) and SCSI.

The communication data structure 273/277 includes device specification information. The device specification information includes a device type, a connection bus type, and a device identifier. The communication data structure 273/277 includes a transfer mode over a connection bus and information to be transferred through the connection bus. The information to be transferred includes a command, status, and data.

The communication data structure 273 in the case of USB includes industrial equipment being the device type, USB being the connection bus, and IE001 being the device identifier, as the device specification information. The communication data structure 273 in the case of USB includes a USB control transfer as the transfer mode, and a USB request or a device descriptor as the transfer information. Such a structure eliminates the need to consider a limitation of a maximum number of 127 in conventional USB connection.

The communication data structure 277 in the case of other interface types being HDMI (registered trademark) and SCSI includes a monitor, HDMI (registered trademark), MT0002, and a CD, SCSI, and CD0005 as the device specification information. Further, the structure includes HDMI (registered trademark) control and SCSI control as the transfer mode 2, and DDC/CED and command/response as the transfer information.

(Data Transmission Example)

Figure 2G:
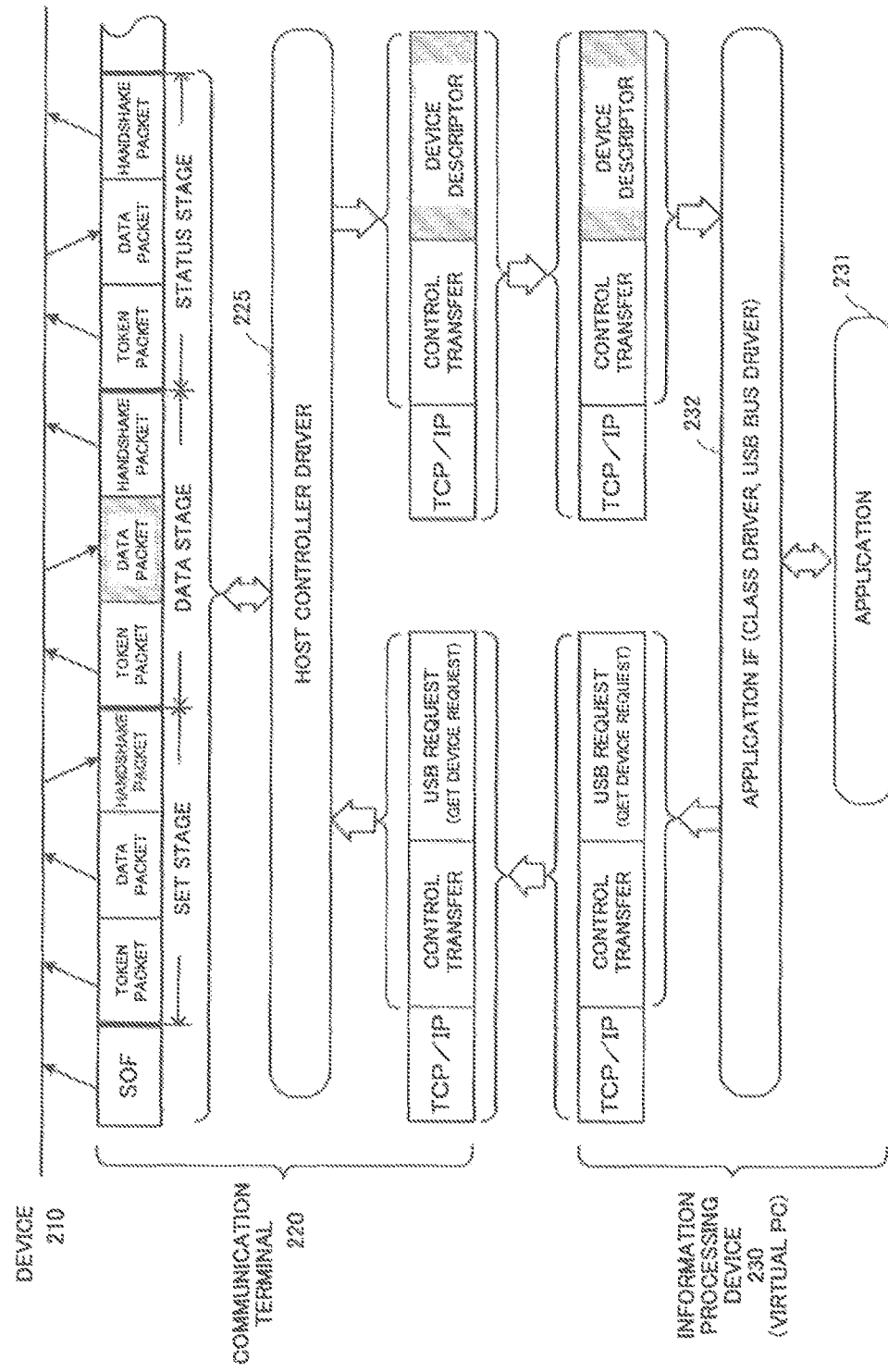
FIG. 2G is a diagram illustrating data transmission in the information processing system according to the second example embodiment of the present invention.

FIG. 2G is a diagram illustrating data transmission in the information processing system 200 according to the present example embodiment. While FIG. 2G illustrates L2-level communication at the USB device, the communication may be performed in a lower layer or a higher layer.

FIG. 2G is a sequence diagram illustrating a descriptor acquisition procedure of a USB-connected USB device.

A descriptor set to the device 210 is acquired by a USB request such as GET_DESCRIPTOR. Each USB request is exchanged with the device 210 by a control transfer. Each control transfer includes a setup stage, a data stage, and a status stage. Each stage is composed of a token packet, a data packet, and a handshake packet. A descriptor is acquired in a data packet in each data stage. A descriptor acquired from the device 210 is IP encapsulated by an IP header and a TCP header, and is transmitted from the USB hub 221 composed of a mobile terminal to the information processing device 230.

In response to a device input-output request by the application 231, the class driver 232 and the bus driver constituting the application interface in the information processing device 230 first generate a control transfer and a USB request GET DESCRIPTOR in order to check a connected device. Then the drivers pass the control transfer and the USB request to the communication control unit.

The control transfer and the USB request GET DESCRIPTOR that are IP encapsulated by an IP header and a TCP header are received by the communication control unit in the USB hub 221 composed of a communication terminal, and are IP decapsulated. The control transfer and the USB request GET DESCRIPTOR are passed to the host controller driver 225. The host controller driver 225 instructs the USB bus interface (unillustrated) to generate each packet to the device 210 over the USB bus, in accordance with the control transfer and the USB request GET DESCRIPTOR.

The host controller driver 225 extracts a data packet received from the device 210 in a data stage as a device descriptor, and passes the data packet to the communication control unit as a control transfer and a device descriptor. The control transfer and the device descriptor that are IP encapsulated by an IP header and a TCP header are transmitted from the communication control unit in the USB hub 221 composed of a communication terminal to the communication control unit in the information processing device 230.

When the communication control unit in the information processing device passes the decapsulated control transfer and the decapsulated device descriptor to the bus driver and the class driver 232 constituting the application interface, the class driver 232 makes notification of connected device information in response to the device input-output request by the application 231.

Similar data transmission is subsequently performed in another control transfer, a bulk transfer, an interrupt transfer, and an isochronous transfer. The host controller driver 225 and the USB bus interface 226 may be integrated into one piece of software.

<<Concept of HDMI (Registered Trademark) Device Connection>>

Figure 3A:
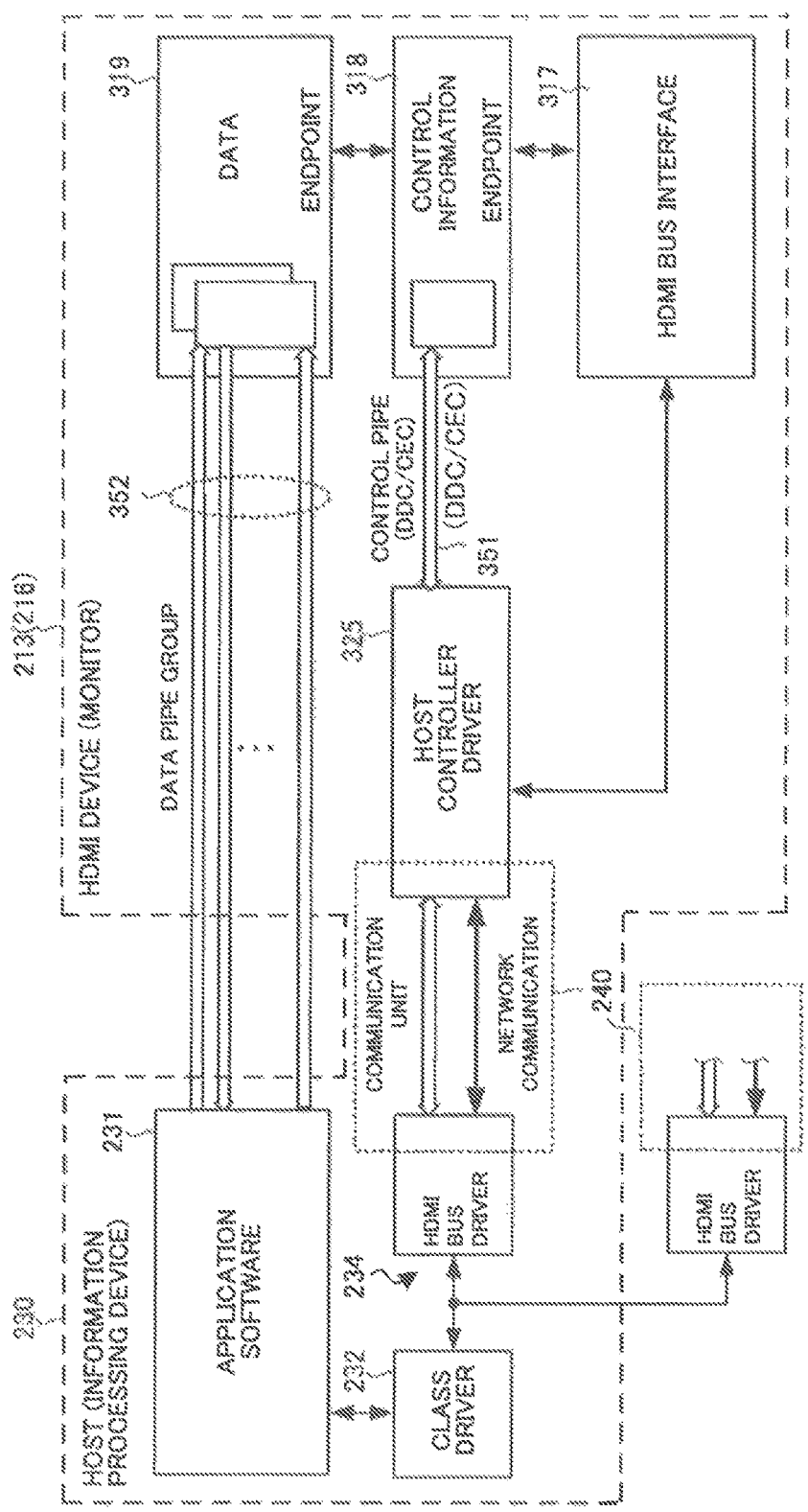
FIG. 3A is a diagram illustrating a concept of HDMI (registered trademark) device connection according to the second example embodiment of the present invention.

FIG. 3A is a diagram illustrating a concept of HDMI (registered trademark) device connection according to the present example embodiment. Note that, in FIG. 3A, a same reference sign is given to a same component as a component in FIG. 2C, and description thereof is omitted.

The host 230 includes, as software, the application software 231, the class driver 232 as part of a device driver, and a plurality of HDMI (registered trademark) bus drivers relating to operation equipment and being distributed from the class driver 232. The plurality of HDMI (registered trademark) bus drivers distributed from the class driver 232 constitute the virtual monitor distributor 234.

The host 230 as an information processing device is connected to the HDMI (registered trademark) device 213 (216) through the network 240. The HDMI (registered trademark) device 213 (216) includes a host controller driver 325 and directly communicates with the host 230 to control a device. Further, physical connection by an HDMI (registered trademark) cable does not exist. The host controller driver 325 directly performs data exchange between an HDMI (registered trademark) buffer and an endpoint through an HDMI (registered trademark) bus interface 317.

The HDMI (registered trademark) device 213 (216) includes, as software, the HDMI (registered trademark) bus interface 317 in the HDMI (registered trademark) device 213 (216), exchanging a signal with the host controller driver 325. Further, the HDMI (registered trademark) device 213 (216) includes an endpoint 318 of control information, storing a descriptor including device information and control information, and an endpoint 319 storing input-output data.

By such connection and by a system-level control transfer through the class driver 232 constituting an application interface, an HDMI (registered trademark) bus driver, the network 240, and the host controller driver 325, control communication as basic processing is provided between the application software 231 and the endpoint 318 through a control pipe (Display Data Channel [DDC]/Consumer Electronics Control [CEC]) 351. Further, in an application-level data transfer, TMDS data communication as each method of a device class is provided between the application software 231 and the endpoint 319 through a data pipe group 352.

As described above, a unified communication channel (pipe) can be formed by network communication between the HDMI (registered trademark) bus driver in the host 230 and the host controller driver 325 in the HDMI (registered trademark) device 213 (216) through the network 240, and serial communication between the host controller driver 325 and the HDMI (registered trademark) bus interface 317.

Such a configuration enables an HDMI (registered trademark) device remotely and directly connected through a network to be operated in a same manner as an HDMI (registered trademark) device connected to an information processing device.

(Information Flow)

Figure 3B:
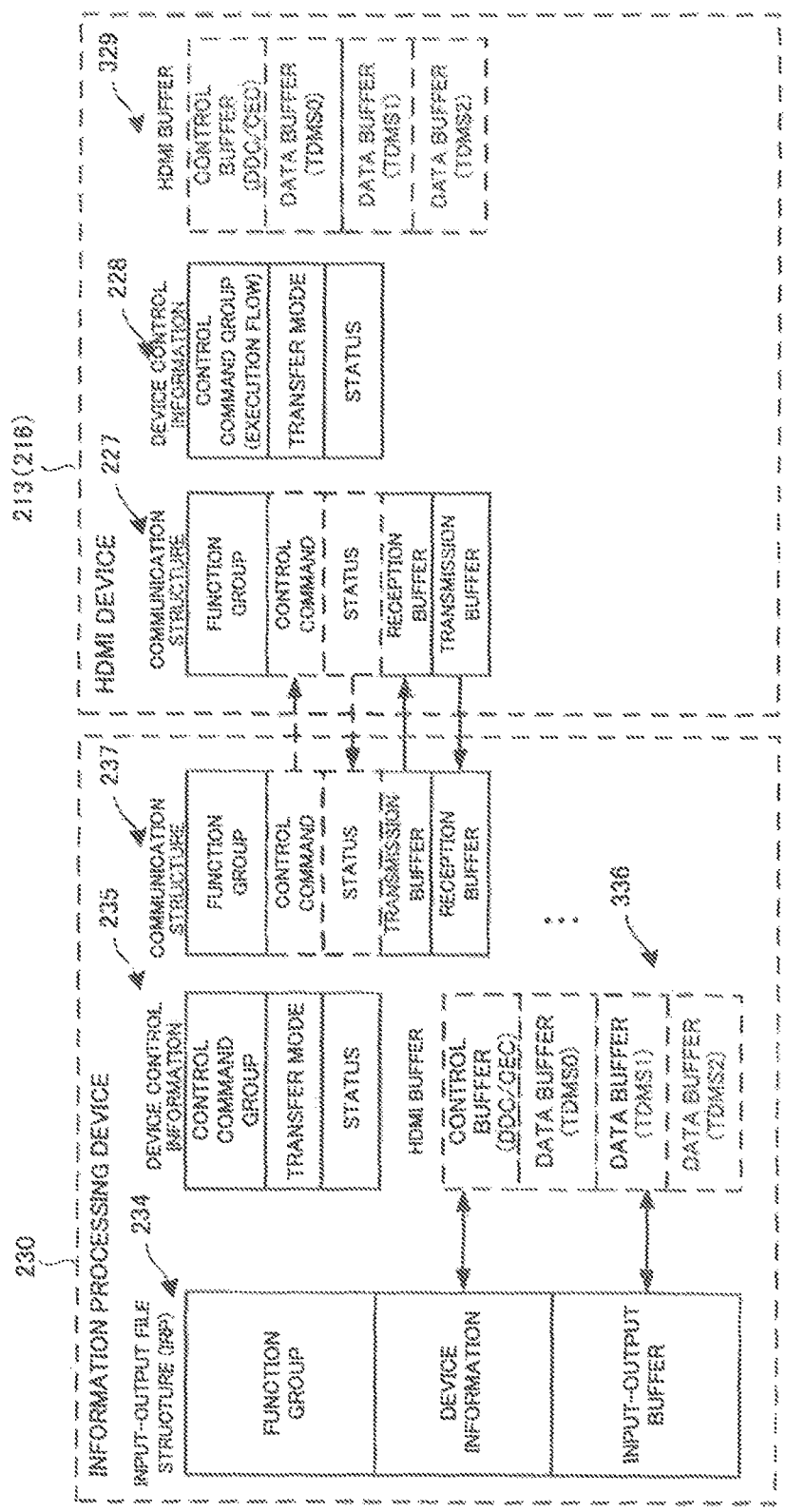
FIG. 3B is a diagram illustrating an information flow in the HDMI (registered trademark) device connection according to the second example embodiment of the present invention.

FIG. 3B is a diagram illustrating an information flow in the HDMI (registered trademark) device connection according to the present example embodiment. Note that, a same reference sign is given to a component similar to a component in FIG. 2D, and description thereof is omitted.

A buffer generated in the information processing device 230 is an HDMI (registered trademark) buffer 336, and is composed of a control buffer and three data buffers. Similarly, a device buffer in the HDMI (registered trademark) device 213 (216) is an HDMI (registered trademark) buffer 329, and is composed of a control buffer and three data buffers.

Structures of a communication message and the like are similar to FIGS. 2E to 2G, and therefore detailed description thereof is omitted.

<<Functional Configuration of Information Processing Device>>

Figure 5:
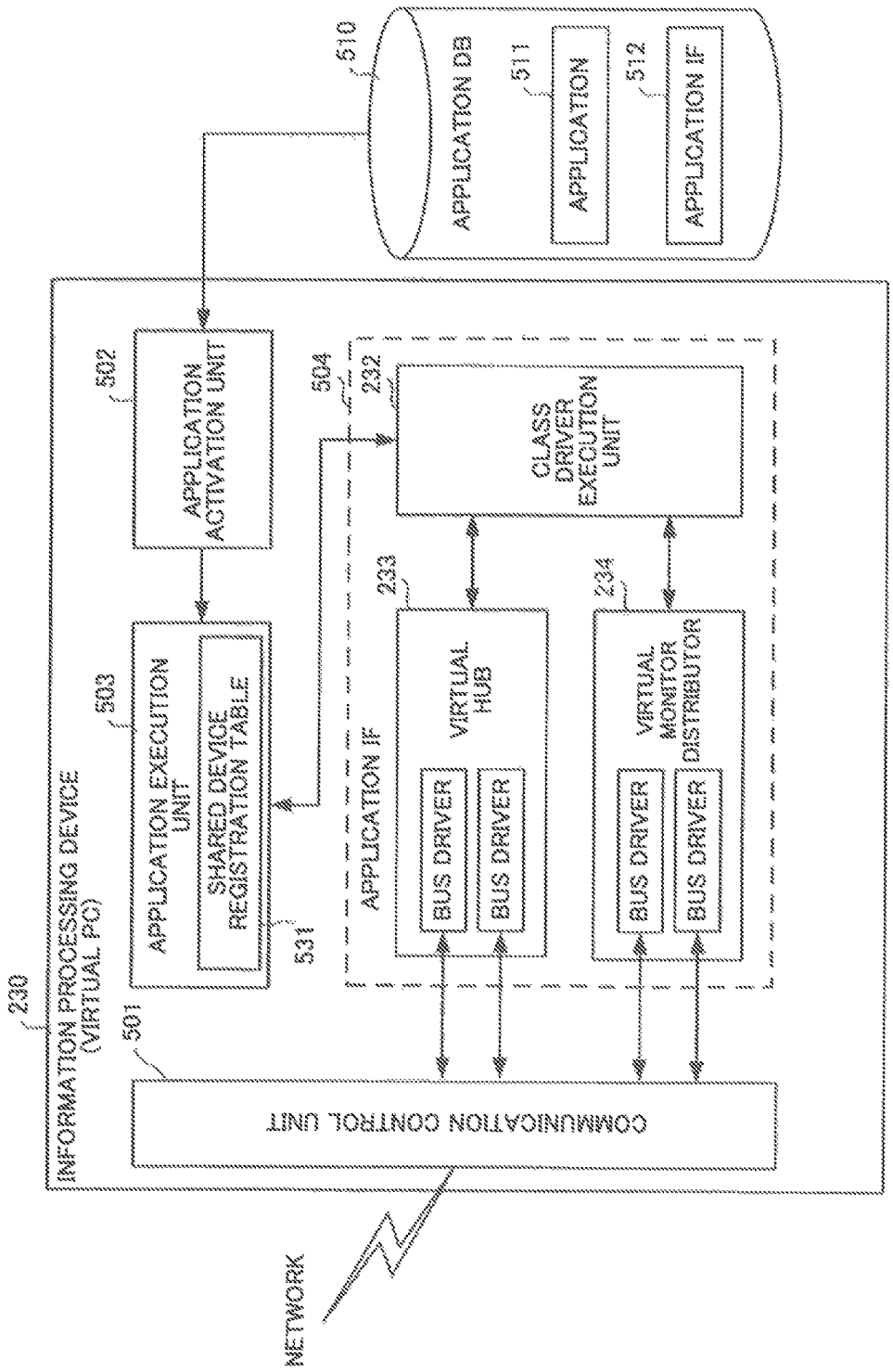
FIG. 5 is a block diagram illustrating a functional configuration of an information processing device according to the second example embodiment of the present invention.

FIG. 5 is a block diagram illustrating a functional configuration of the information processing device 230 according to the present example embodiment. Note that, in FIG. 5, functional components deeply related to an operation according to the present example embodiment are illustrated, and a regular functional component included in the information processing device 230 is not illustrated. For example, various types of processing functions in a case that the information processing device 230 is a personal computer (hereinafter PC) are not illustrated.

The information processing device 230 includes a communication control unit 501, an application activation unit 502, an application execution unit 503, and an application interface 504. Further, an application database (APPLICATION DB in the diagram) 510 is included inside or outside the information processing device 230.

The communication control unit 501 controls communication with the communication terminal 220 and a communication function unit in a device through the network 240. The application activation unit 502 selects an application from the application database 510 in accordance with a user instruction or a cloud server instruction, and activates the application. The application execution unit 503 includes a shared device registration table 531 used for providing equipment sharing and operation integration, and executes an application activated by the application activation unit 502.

The application interface 504 includes an execution unit 232 executing a class driver, a virtual HUB 233, and a virtual monitor distributor 234. The virtual HUB 233 and the virtual monitor distributor 234 activate bus drivers, the number of which corresponding to the number of communication pipes. The application database 510 stores a plurality of applications 511 and a plurality of application interfaces 512 being part of a device driver.

(Application Database)

Figure 6:
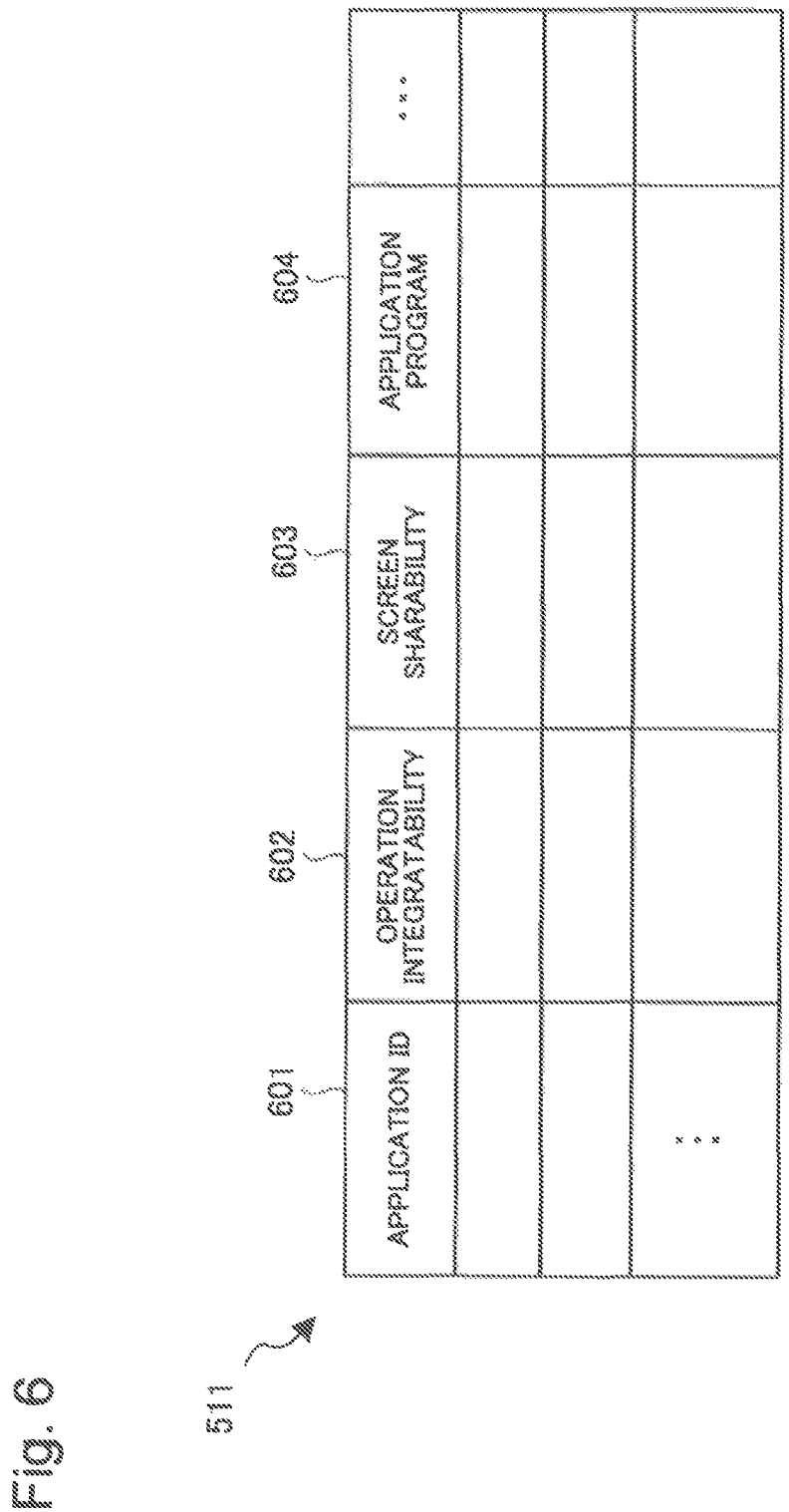
FIG. 6 is a diagram illustrating a structure of an application database according to the second example embodiment of the present invention.

FIG. 6 is a diagram illustrating a structure of the application database 510 according to the present example embodiment. FIG. 6 illustrates a structure of a plurality of applications 511.

The plurality of the applications 511 store, in association with an application ID 601, operation integratability (602) and screen sharability (603) of the application, and an application program 604. The operation integratability (602) and the screen sharability (603) may be embedded in the application program 604.

(Shared Device Registration Table)

FIG. 7 is a diagram illustrating a structure of the shared device registration table 531 according to the present example embodiment. The shared device registration table 531 is used by the application execution unit 503 for providing equipment sharing and operation sharing.

In association with each connected and available shared device 701, the shared device registration table 531 stores a class driver ID 702, virtual HUB connectivity information 703, and virtual monitor distributor connectivity information 704. As for the virtual HUB connectivity information 703 and the virtual monitor distributor connectivity Information 704, use status (o denotes in use and x denotes unused) and a bus driver ID are stored.

<<Hardware Configuration of Information Processing Device>>

Figure 8:
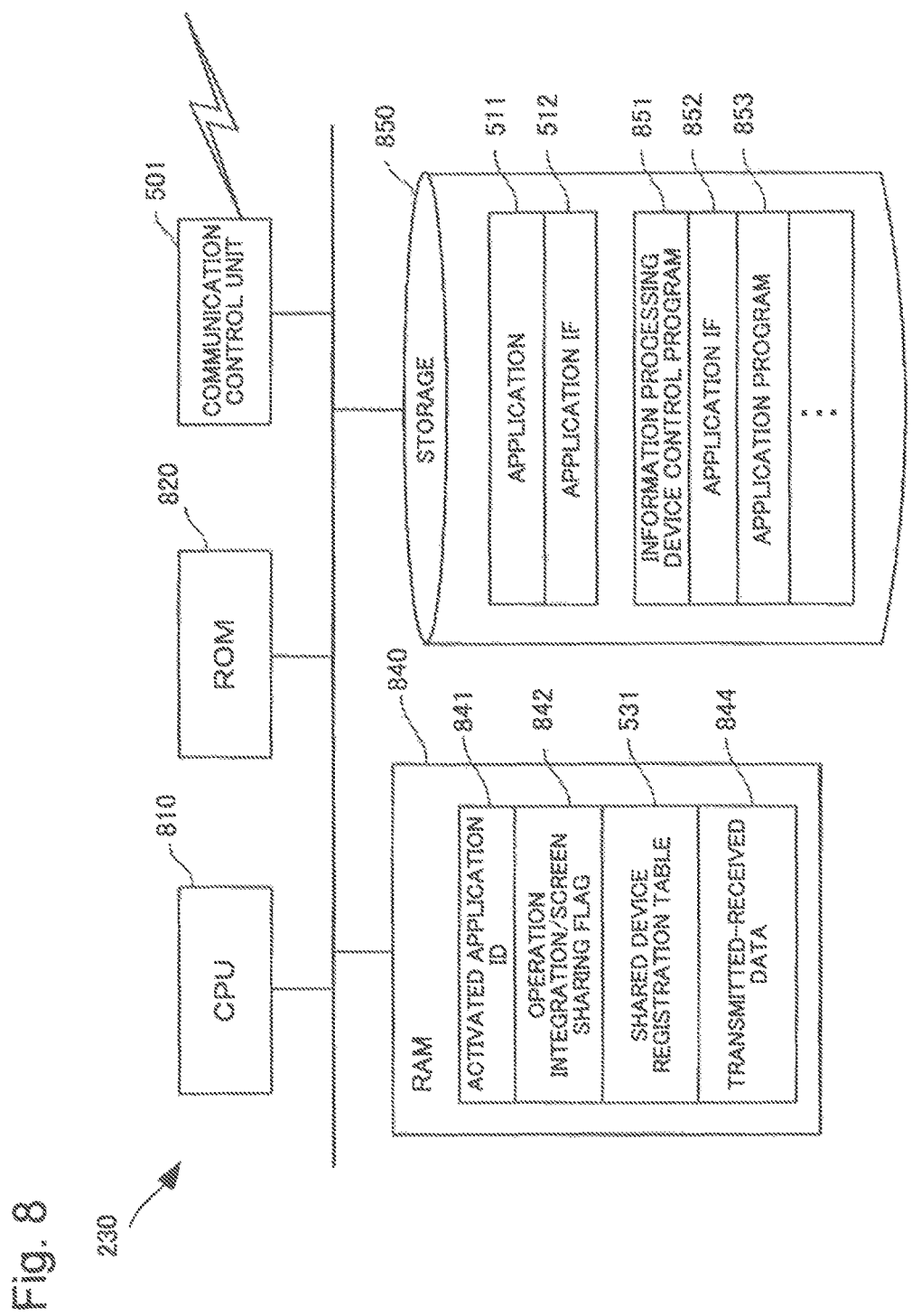
FIG. 8 is a block diagram illustrating a hardware configuration of the information processing device according to the second example embodiment of the present invention.

FIG. 8 is a block diagram illustrating a hardware configuration of the information processing device 230 according to the present example embodiment.

In FIG. 8, a central processing unit (CPU) 810 is a processor for arithmetic control, and provides the functional components in the information processing device 230 in FIG. 5 by executing a program. A read only memory (ROM) 820 stores initial data, fixed data for a program and the like, and a program. Further, a communication control unit 401 communicates with the communication terminal 220 through the network 240. The CPU 810 is not limited to a single CPU, and may include a plurality of CPUs or a graphics processing unit (GPU) for image processing. Further, it is desirable that the communication control unit 501 include a CPU independent of the CPU 810, and write or read transmitted and received data into or from a random access memory (RAM) 840 area. Further, it is desirable that a direct memory access controller (DMAC) (unillustrated) transferring data between the RAM 840 and a storage 850 be provided. Accordingly, the CPU 810 processes data, recognizing that data are received by or transferred to the RAM 840. Further, the CPU 810 prepares the processing result in the RAM 840 and delegates subsequent transmission or transfer to the communication control unit 501 or the DMAC.

The RAM 840 is a random access memory used by the CPU 810 as a work area for temporary storage. An area for storing data required for providing the present example embodiment is secured in the RAM 840. An activated application ID 841 is an identifier of a currently activated application. An operation integration/screen sharing flag 842 is a flag indicating whether or not operation integration, and screen sharing are being performed in a currently activated application. The shared device registration table 531 is a table illustrated in FIG. 7.

Transmitted-received data 844 are data transmitted and received through the communication control unit 501.

The storage 850 stores a database, various types of parameters, or the following data or programs required for providing the present example embodiment. The application 511 is a registered application. The application interface 512 is a driver including a class driver and a bus driver and being executed in the information processing device 230.

The storage 850 stores the following programs. An information processing device control program is a basic program controlling the entire information processing device 230. An application interface 852 is a driver including the class driver and the bus driver that are read from the application interface 512 and executed in the information processing device 230. An application program 853 is an application being read from and executed by the application 511.

Mote that a program and data related to a general-purpose function and another performable function, being implemented on the information processing device 230, are not illustrated in the RAM 840 and the storage 850 in FIG. 8.

<<Processing Procedure of Information Processing Device>>

Figure 9:
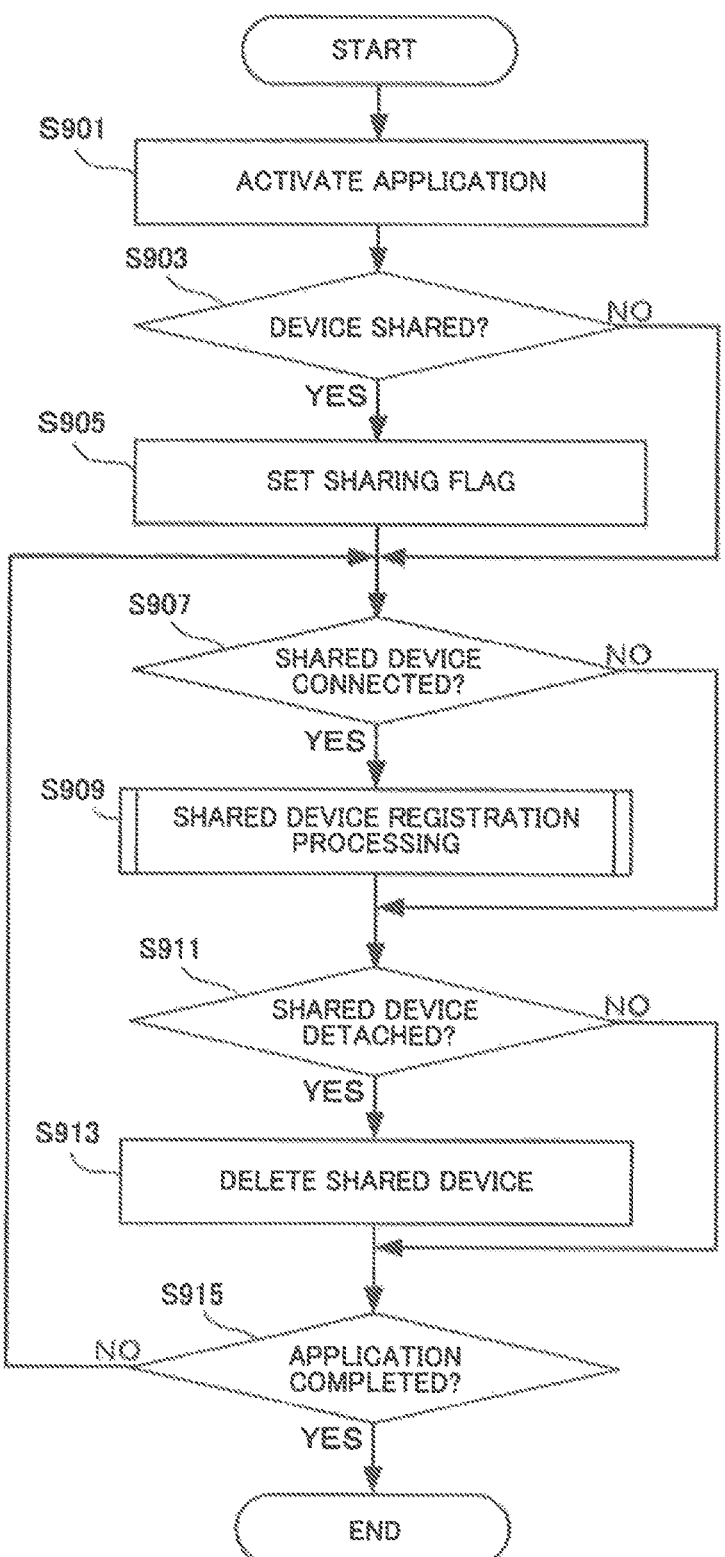
FIG. 9 is a flowchart illustrating a processing procedure of the information processing device according to the second example embodiment of the present invention.

FIG. 9 is a flowchart illustrating a processing procedure of the information processing device 230 according to the present example embodiment. The CPU 810 in FIG. 8 executes the flowchart using the RAM 840 to provide the functional components in FIG. 5.

In Step S901, the information processing device 230 activates an application. Next, in Step S903, the information processing device 230 determines whether or not the activated application performs device sharing. When the activated application performs device sharing, in Step S905, the information processing device 230 sets a sharing flag. Next, in Step S907, the information processing device 230 determines whether or not a shared device is connected and available. When the shared device is connected and available, in Step S909, the information processing device 230 performs registration processing of the shared device.

After the registration processing of the shared device, in Step S911, the information processing device 230 determines detachment or unavailability of the shared device. In a case of detachment or unavailability of the shared device, in Step S913, the information processing device 230 deletes the shared device from the system.

In Step S915, the information processing device 230 determines whether or not the application is completed. When the application is not completed, the information processing device 230 returns to Step S907 to further determine connection of a shared device.

(Shared Device Registration Processing)

Figure 10:
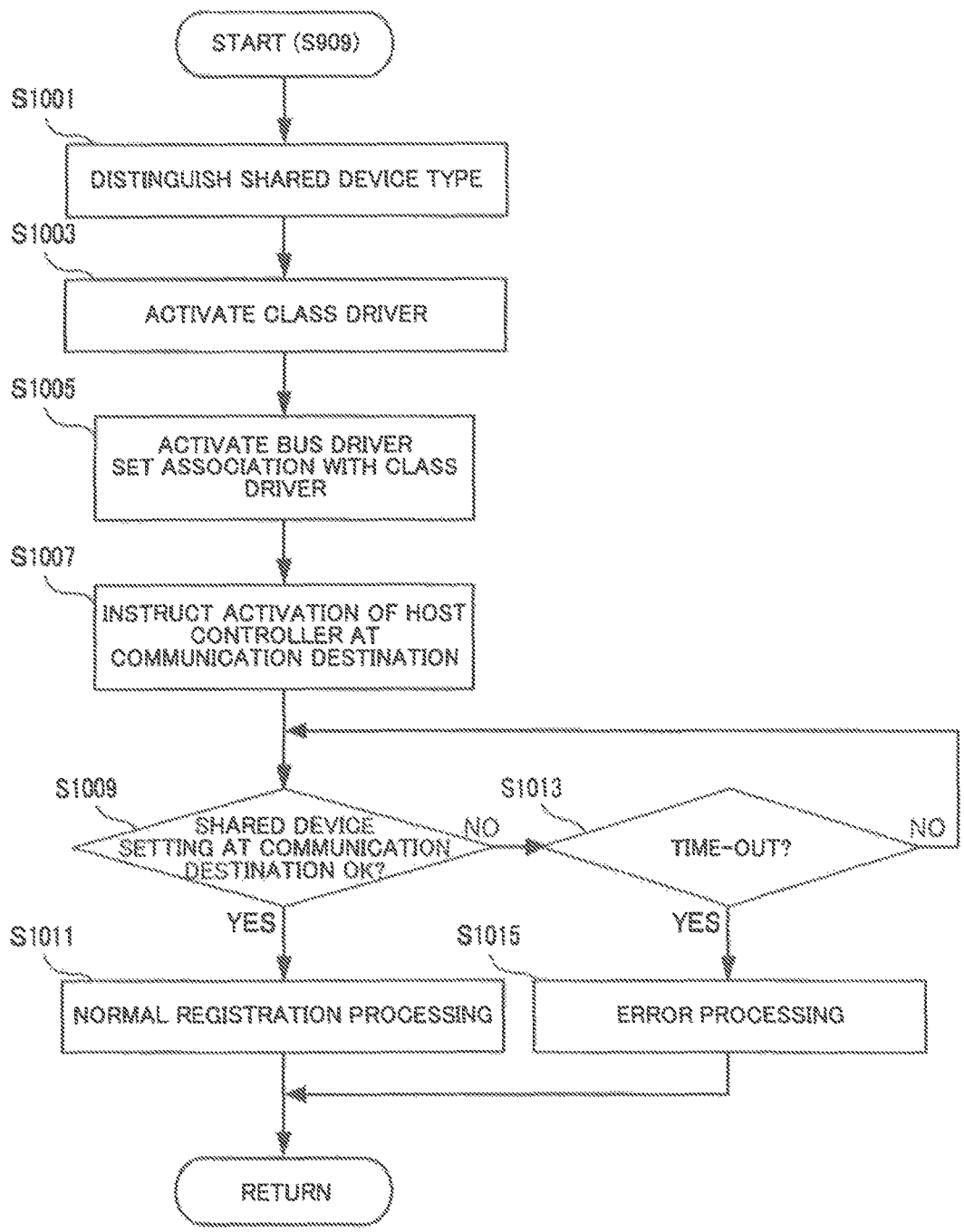
FIG. 10 is a flowchart illustrating a procedure of shared device registration processing according to the second example embodiment of the present invention.

FIG. 10 is a flowchart illustrating a procedure of the shared device registration processing (S909) according to the present example embodiment.

In Step S1001, the information processing device 230 distinguishes a type of a shared device being connected and available. Such distinction of a device type is provided by acquisition of a device descriptor through remote communication. In Step S1003, the information processing device 230 activates a class driver related to the device type. Next, in Step S1005, the information processing device 230 activates a bus driver related to a bus connecting the device and associates the bus driver with the class driver.

In Step S1007, the information processing device 230 instructs activation of a host controller driver in a communication terminal or a communication function unit at a communication destination, by the activated class driver and bus driver. Then, in Step S1009, the information processing device 230 determines whether or not a setting to a shared driver at the communication destination is OK. When a response indicates OK, in Step S1011, the information processing device 230 performs normal registration processing. When the response indicates not OK, the information processing device 230 repeats the determination in Step S1009 until a time-out is reached. When a time-out is reached, the information processing device 230 proceeds from Step S1013 to S1015 to perform error processing.

The present example embodiment is able to perform operation integration in a remote operation device and a remote display device that are connected to a PC through communication.

Third Example Embodiment

Next, a communication processing system according to a third example embodiment will be described. The communication processing system according to the present example embodiment differs from the aforementioned second example embodiment in sharing a device connected to a virtual PC built on a cloud server, through communication. The remaining configuration and operation are similar to the second example embodiment, and therefore a same configuration and operation are respectively given same reference signs, and detailed description thereof is omitted.

<<Configuration of Information Processing System>>

Figure 11:
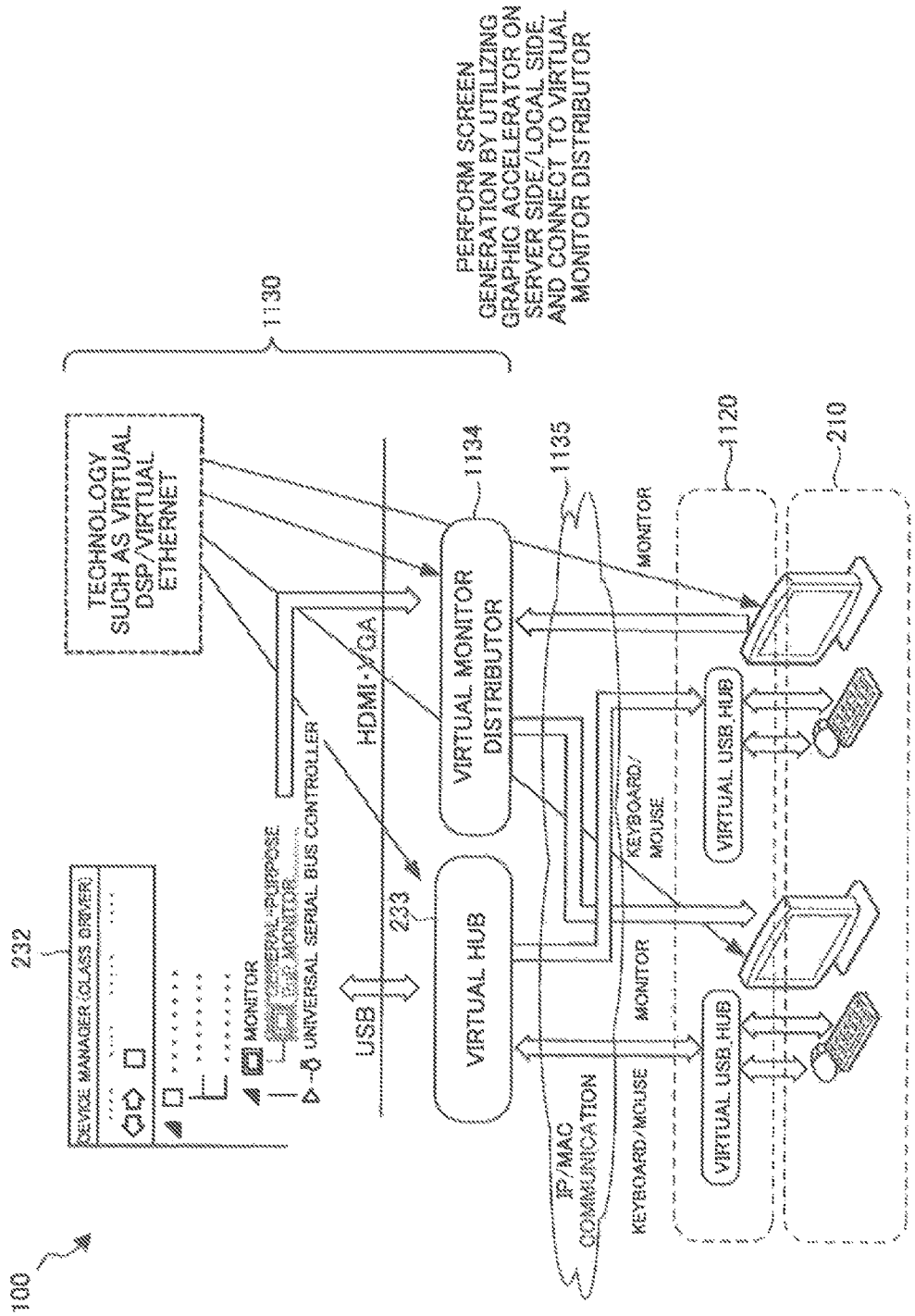
FIG. 11 is a block diagram illustrating a configuration of an information processing system according to a third example embodiment of the present invention.

FIG. 11 is a block diagram illustrating a configuration of an information processing system 1100 according to the present example embodiment. Note that, in FIG. 11, a same reference sign is given to a component similar to a component in FIG. 2A, and description thereof is omitted.

In FIG. 11, an information processing device 1130 is a virtual PC built on a cloud server. A virtual monitor distributor 1134 communicates with a communication terminal or a communication function unit 1120 by IP/MAC communication. At this time, screen generation can be performed by utilizing a graphic accelerator on the server side/local side, and the generated screen Is connected to the virtual monitor distributor 1134 to be distributed.

(Software Configuration)

Figure 12:
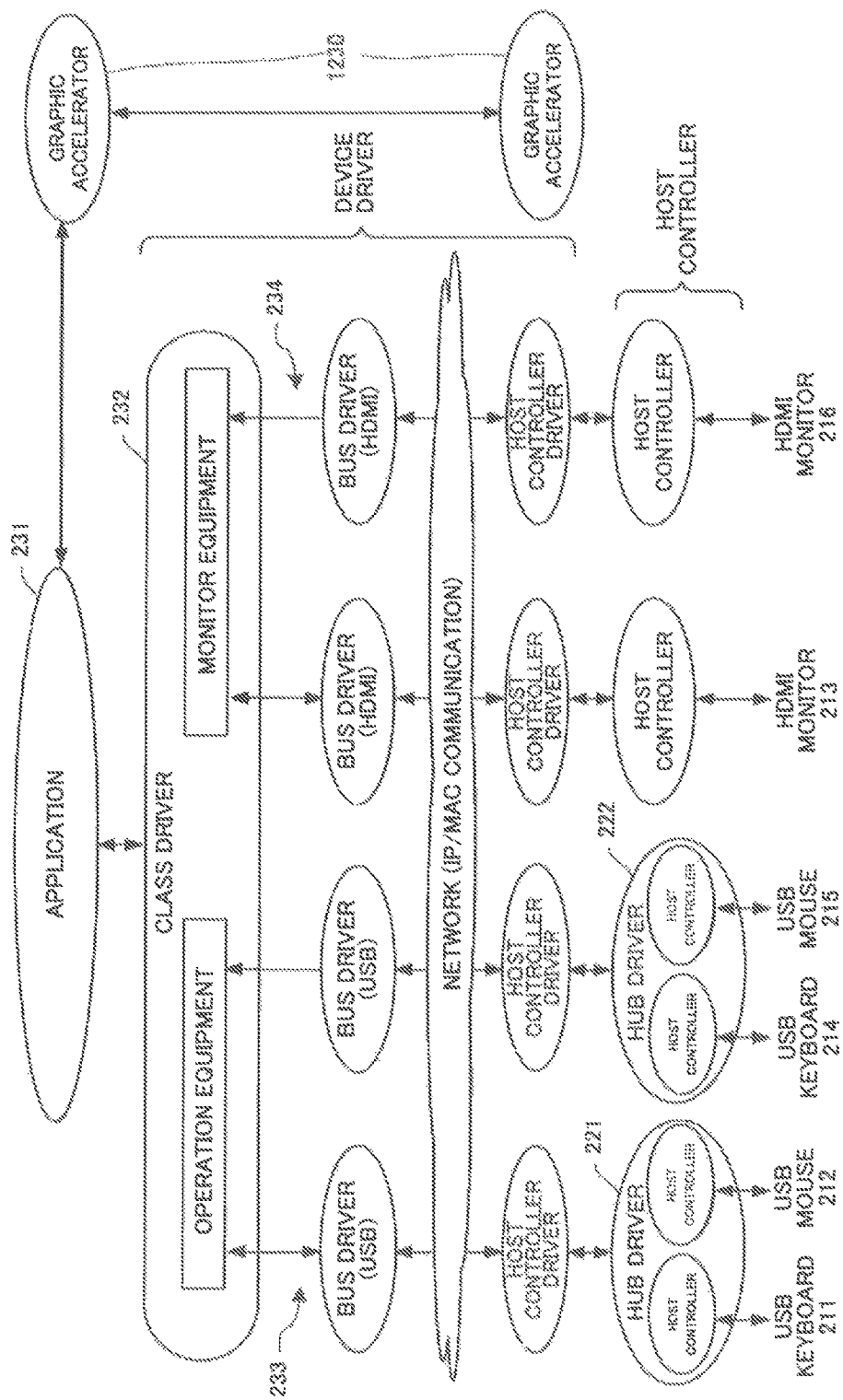
FIG. 12 is a diagram illustrating a software configuration of the information processing system according to the third example embodiment of the present invention.

FIG. 12 is a diagram illustrating a software configuration of the information processing system 1100 according to the present example embodiment. Note that, in FIG. 12, a same reference sign is given to a component similar to a component in FIG. 2B, and description thereof is omitted.

In FIG. 12, a graphic accelerator 1230 on the server side/local side is added, and is used for screen generation by an application 231.

The present example embodiment is able to perform operation integration in a remote operation device and a remote display device that are connected to a virtual PC through communication.

Fourth Example Embodiment

Next, an information processing system according to a fourth example embodiment will be described. The information processing system according to the present example embodiment differs from the aforementioned second and third example embodiments in storing and saving successfully connected equipment for operation integration, and setting information thereof into a database, and using the saved information. The remaining configuration and operation are similar to the second and third example embodiments, and therefore a same configuration and operation are respectively given, same reference signs, and detailed description thereof is omitted.

<<Configuration of Information Processing System>>

FIG. 13A is a block diagram illustrating a configuration of an information processing system 1301 according to the present example embodiment. Note that, in FIG. 13A, a same reference sign is given to a same component as a component in FIG. 2A or 11, and description thereof is omitted.

In FIG. 13A, a setting history database 1330 is provided. The setting history database 1330 accumulates a history of setting information 1331 of a display-sharing monitor and setting information 1332 of operation-integrated operation equipment (keyboard, mouse). In new equipment sharing, connected equipment and a successful setting are located in the setting history database 1330 and used. Further, in FIG. 13A, processing 1320 of preventing a communication error due to jitter in IF/MAC communication 1135 and an insufficient communication band, by providing a communication buffer (FIFO), is also added.

Figure 13B:
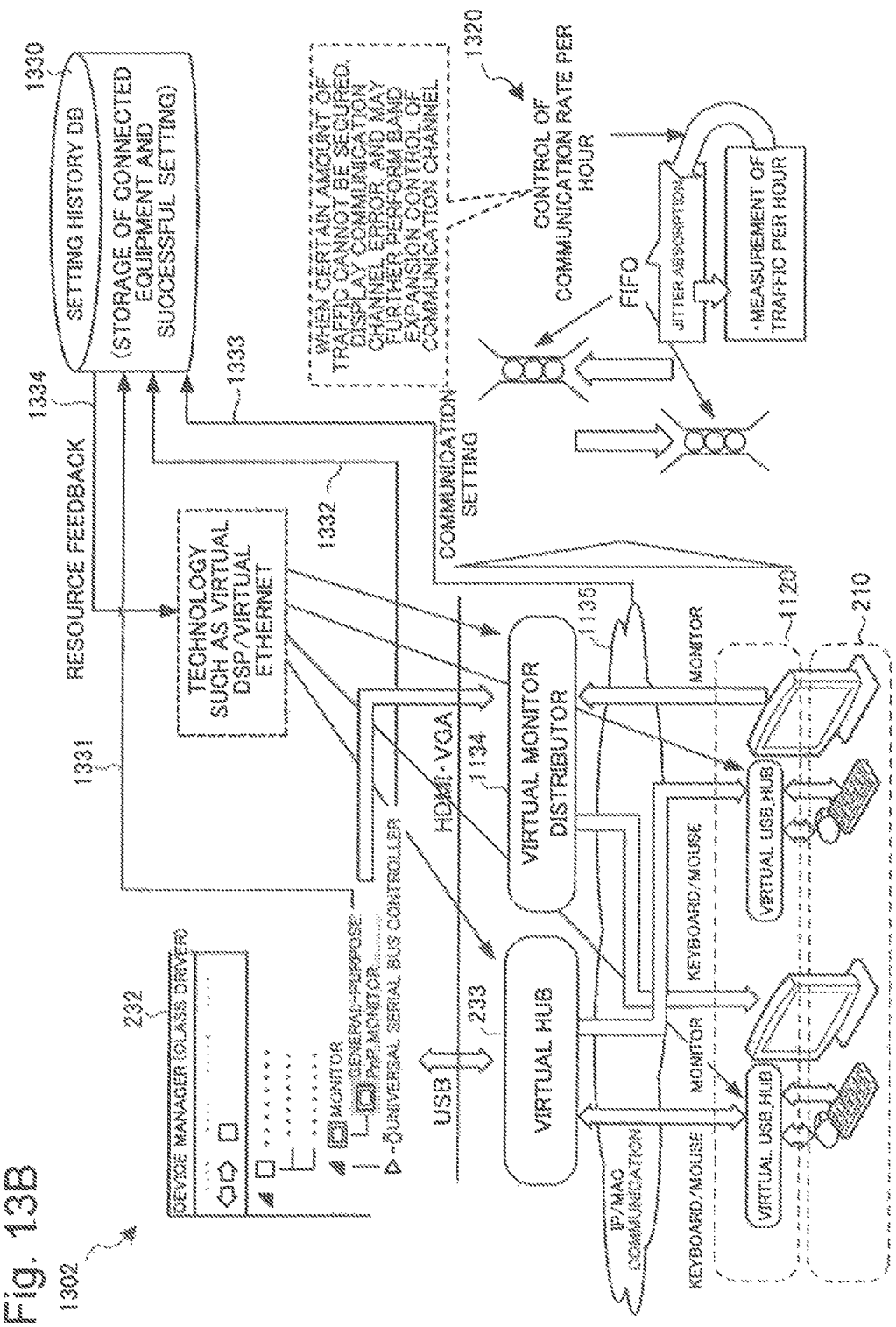
FIG. 13B is a block diagram illustrating another configuration of the information processing system according to the fourth example embodiment of the present invention.

FIG. 13B is a block diagram illustrating a configuration of an information processing system 1302 according to the present example embodiment. Note that, in FIG. 13B, a same reference sign is given to a same component as a component in FIG. 2A, 11, or 13A, and description thereof is omitted.

In FIG. 13B, the setting history database 1330 further accumulates a history of a communication setting 1333 including a capacity of a communication buffer (FIFO). In new equipment sharing, a suitable communication setting is located in the setting history database 1330 and used, in addition to connected equipment and a successful setting (resource feedback 1334).

(Software Configuration)

FIG. 14 is a diagram illustrating a software configuration of the information processing systems 1301 and 1302 according to the present example embodiment. Note that, in FIG. 14, a same reference sign is given to a same component as a component in FIG. 2B or 12, and description thereof is omitted.

In FIG. 14, a history of setting information is accumulated in the setting history database 1330. In new equipment sharing, a setting control flow 1431 is provided as middleware 1430 for locating successful setting information in the setting history database 1330, supporting efficient execution of an application 231.

(Setting History Database)

FIG. 15 is a diagram illustrating a structure of the setting history database 1330 according to the present example embodiment. The setting history database 1330 may be included in the information processing device or in a cloud server outside the information processing device.

In association with an application ID 1501, the setting history database 1330 stores, as a past history, a combination of a plurality of pieces of operation equipment 1502, a plurality of pieces of screen-sharing equipment 1503, and a communication buffer 1504. The plurality of pieces of operation equipment 1502 and the plurality of pieces of screen-sharing equipment 1503 store equipment types and sharing setting information. Further, the communication buffer 1504 stores a setting location and a capacity. Further, the setting history database 1330 stores an evaluation value 1505 of a system in the combination. A suitable combination is selected in accordance with such an evaluation value 1501.

<<Processing Procedure of Setting Control Flow>>

Figure 16:
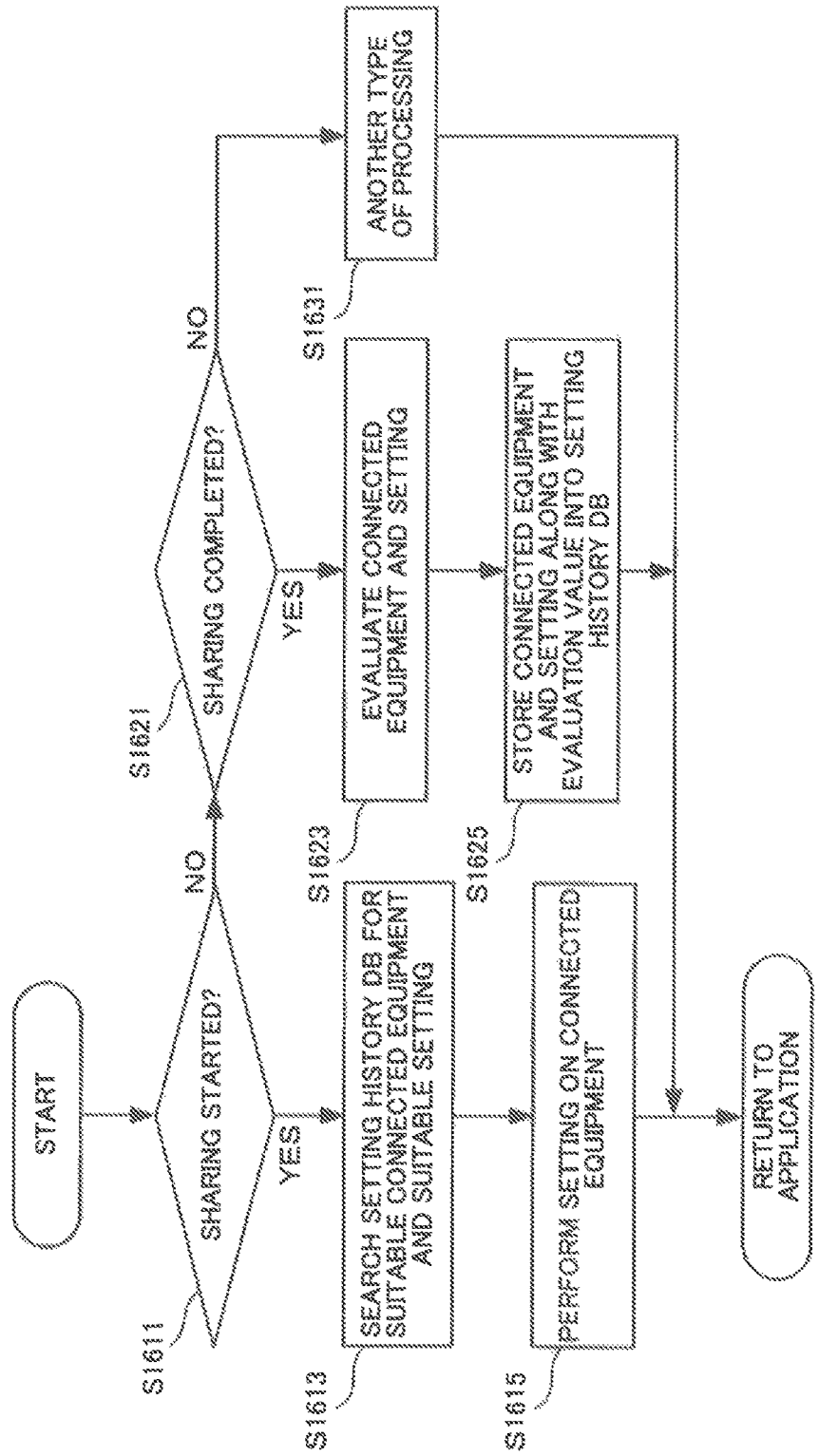
FIG. 16 is a flowchart illustrating a processing procedure of a setting control flow according to the fourth example embodiment of the present invention.

FIG. 16 is a flowchart illustrating a processing procedure of a setting control flow according to the present example embodiment. While the flowchart may be performed by the information processing device, it is basically desirable that the flowchart be performed by a cloud server.

In Step S1611, a cloud server determines whether or not application sharing is started. When determining that the sharing is started, in Step S1613, the cloud server searches the setting history database 1330 for suitable connected equipment and a suitable setting. Then, in Step S1615, the cloud server sets the selected setting information to connected equipment.

When determining that application sharing is not started, in Step S1621, the cloud server determines whether or not the application sharing is completed. When determining that the sharing is completed, in Step S1623, the cloud server evaluates the connected equipment and the setting. Among various evaluation criteria, the simplest criterion is existence of a communication error. Then, in Step S1625, the cloud server stores the connected equipment and the setting along with an evaluation value into the setting history database 1330.

In a case that sharing is not started nor completed by the application, in Step S1621, the cloud server performs another type of processing.

While communication setting is not described in FIG. 16, the processing is similar when added to the connected equipment and the setting.

The present example embodiment is able to save and reuse successfully connected equipment for a sharing operation, and setting information thereof.

Fifth Example Embodiment

Next, an information processing system according to a fifth example embodiment will be described. The information processing system according to the present example embodiment differs from the aforementioned second to fourth example embodiments in remotely connecting a shared device used by a plurality of users. The remaining configuration and operation are similar to the second to fourth example embodiments, and therefore a same configuration and operation are respectively given same reference signs, and detailed description thereof is omitted.

<<Configuration of Information Processing System>>

FIG. 17A is a block diagram illustrating a configuration of an information processing system 1701 according to the present example embodiment. Note that, in FIG. 17A, a same reference sign is given to a component similar to a component in FIG. 2A, 11, 13A, or 13B, and description thereof is omitted.

In FIG. 17A, a virtual USB_HUB 1722 in a communication terminal and communication function unit 1721 is connected to a shared printer 1711 and a shared document camera 1712 that are shared and used by a plurality of users. In such connection, the likelihood of a band of the virtual USB_HUB 1722 becoming insufficient is high. Alternatively, considering communication traffic, a communication band of a monitor near the virtual USB_HUB 1722 may also be influenced.

In FIG. 17A, with such an imbalance in a system configuration, successful information as an equipment setting and a communication setting that stably achieve equipment sharing is accumulated in a setting history database 1730 and is used.

When an insufficient communication band of the monitor is created due to an imbalance in communication traffic, and cannot be solved by a communication buffer (FIFO), increasing a compression ratio of image data or thinning out the image data may be considered. In this case, quality of a display screen of the monitor is affected, and therefore it is desirable to make an inquiry to a user.

Figure 17B:
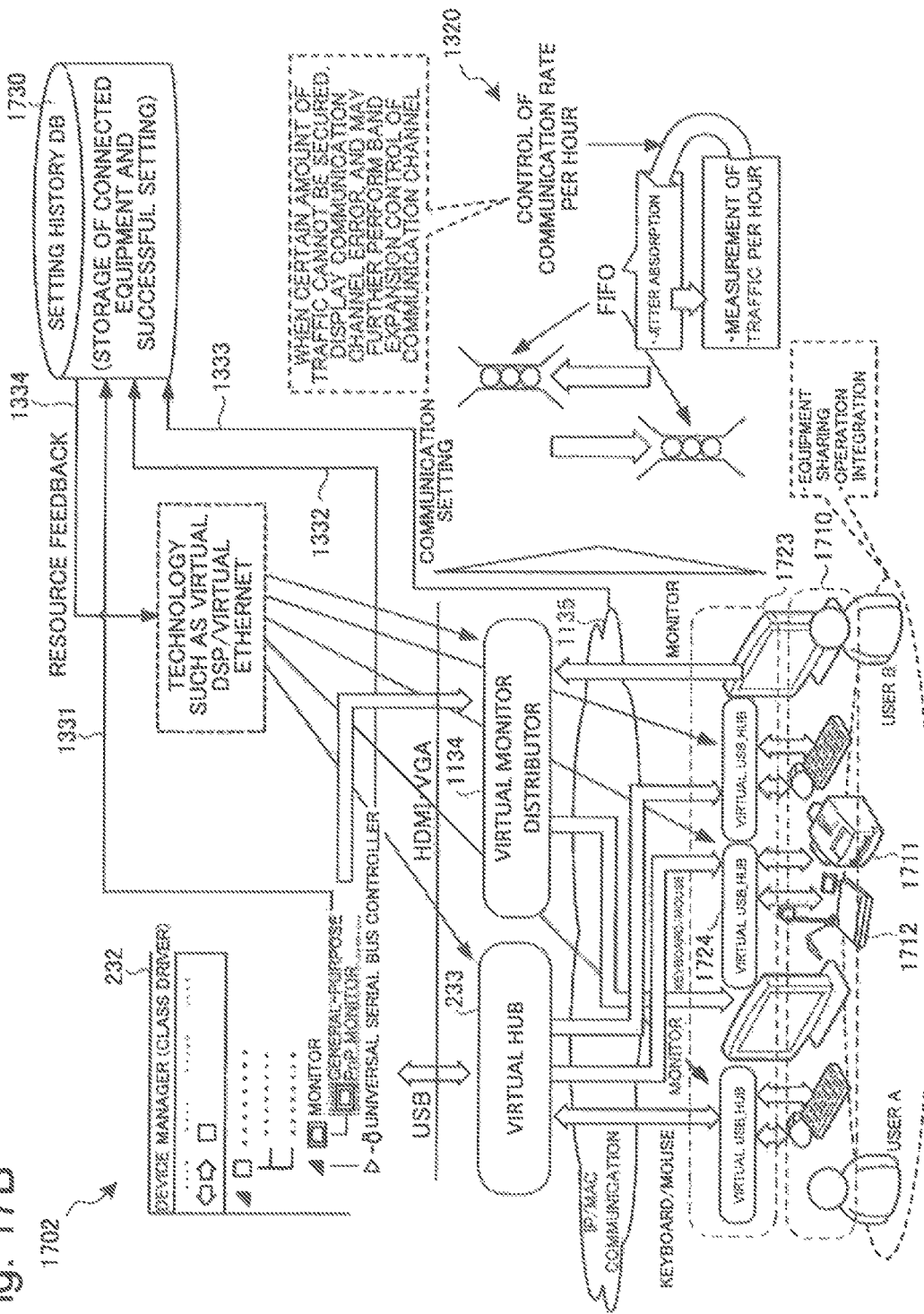
FIG. 17B is a block diagram illustrating another configuration of the information processing system according to the fifth example embodiment of the present invention.

FIG. 17B is a block diagram illustrating a configuration of the information processing system 1701 according to the present example embodiment. Note that, in FIG. 17B, a same reference sign is given to a component similar to a component in FIG. 2A, 11, 13A, 13B, or 17A, and description thereof is omitted.

As a method of eliminating an imbalance in communication traffic, FIG. 17B illustrates connecting the communication terminal and communication function unit 1723 to the shared printer 1711 and the shared document camera 1712 through another communication path by use of a virtual USB_HUB 1724 separate from a virtual USB_HUB connected to a keyboard and a mouse.

(Setting History Database)

FIG. 18 is a diagram illustrating a structure of the setting history database 1730 according to the present example embodiment. Note that, in FIG. 18, a same reference sign is given, to a component similar to a component in FIG. 15, and description thereof is omitted.

The setting history database 1730 stores other types of shared equipment 1706 such as the shared printer 1711 and the shared document camera 1712, a communication buffer 1704 in the combination of equipment, and a data compression ratio 1707. For example, in FIG. 18, the communication buffer 1704 stores necessity for synchronization between monitors, between pieces of operation equipment, between a monitor and operation equipment, and the like. Such synchronization is particularly required in a TV conference system.

The present example embodiment is able to suitably control operation integration in a remotely connected shared device used by a plurality of users, and save and reuse successfully connected equipment and setting information thereof.

Sixth Example Embodiment

Next, an information processing system according to a sixth example embodiment will be described. The information processing system according to the present example embodiment differs from the aforementioned second to fifth example embodiments in including a workflow of how to use shared equipment. The remaining configuration and operation are similar to the second to fifth example embodiments, and therefore a same configuration and operation are respectively given same reference signs, and detailed description thereof is omitted.

<<Configuration of Information Processing System>>

Figure 19:
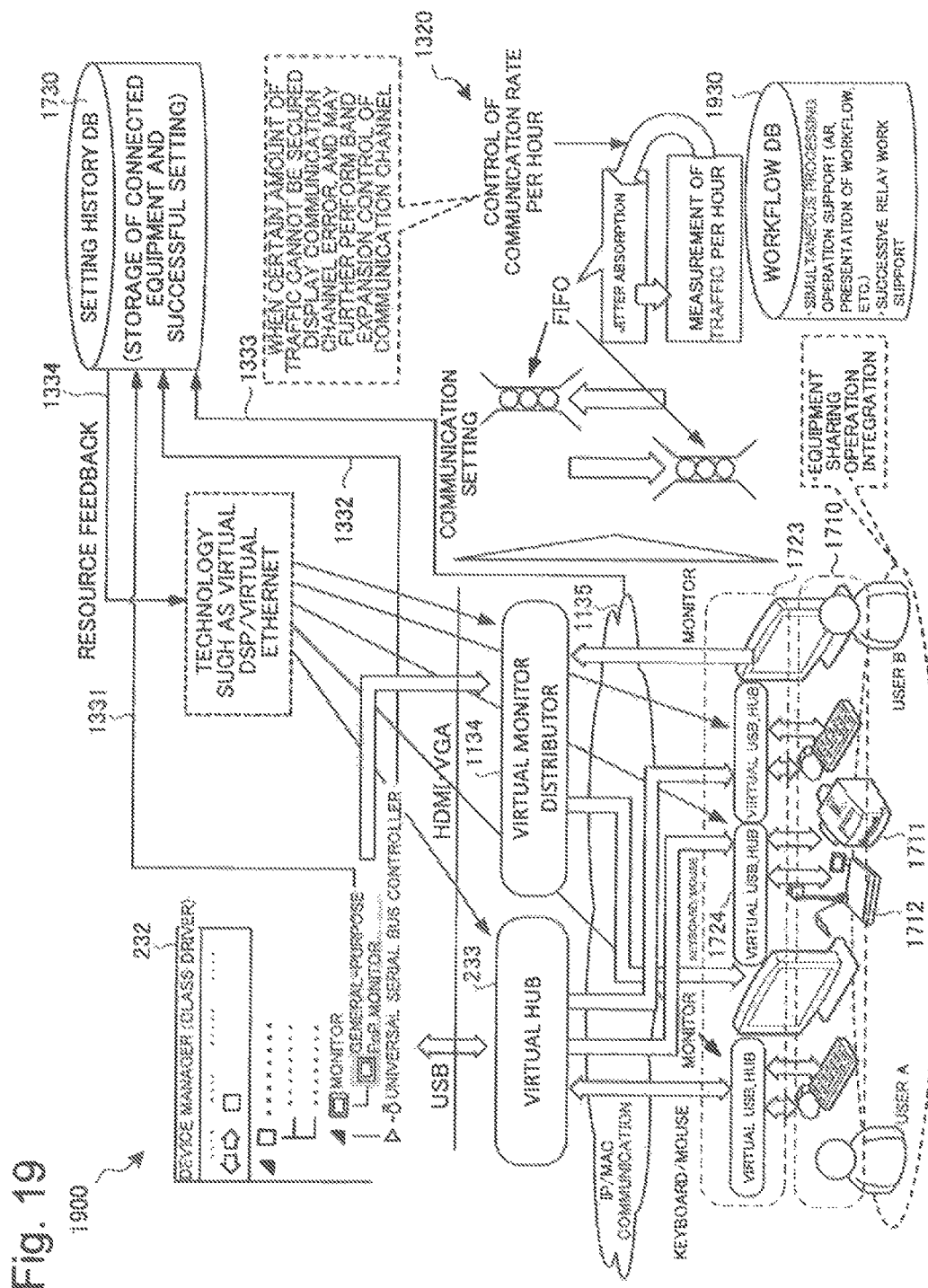
FIG. 19 is a block diagram illustrating a configuration of an information processing system according to a sixth example embodiment of the present invention.

FIG. 19 is a block diagram illustrating a configuration of an information processing system 1900 according to the present example embodiment. Note that, in FIG. 19, a same reference sign is given to a component similar to a component in FIG. 2A, 11, 13A, 13B, 17A, or 17B, and description thereof is omitted.

For example, in FIG. 19, a work support workflow/operation support workflow controlling scheduling when a plurality of users (user A and user B) use a shared printer 1711 and a shared document camera 1712 is included. Alternatively, the workflow controls status (e.g. available and in use) of the shared printer 1711 and the shared document camera 1712. A history of the work support workflow/operation support workflow is accumulated in a workflow database 1930 and is effectively used.

The workflow database 1930 may be integrated with a setting history database 1730.

(Software Configuration)

Figure 20:
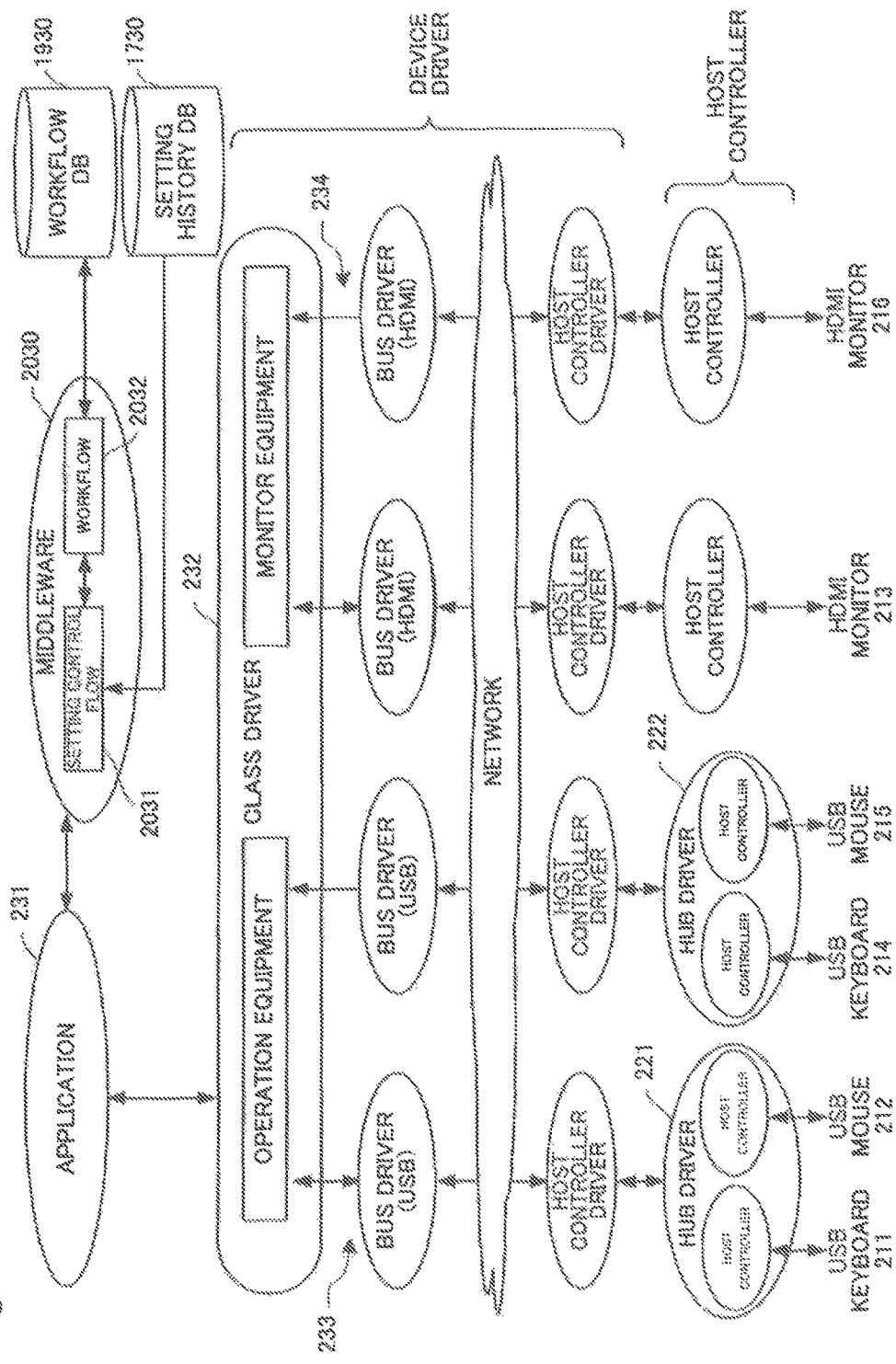
FIG. 20 is a diagram illustrating a software configuration of the information processing system according to the sixth example embodiment of the present invention.

FIG. 20 is a diagram illustrating a software configuration of the information processing system 1900 according to the present example embodiment. Note that, in FIG. 20, a same reference sign is given to a component same as a component in FIG. 2B, 12, or 14, and description thereof is omitted.

In FIG. 20, a history of a workflow is accumulated in the workflow database 1930. In new equipment sharing, a setting control flow 2031 and a workflow 2032 are provided as middleware 2030 for locating successful workflow in the workflow database 1930 to support efficient execution of an application 231.

(Workflow Database)

Figure 21:
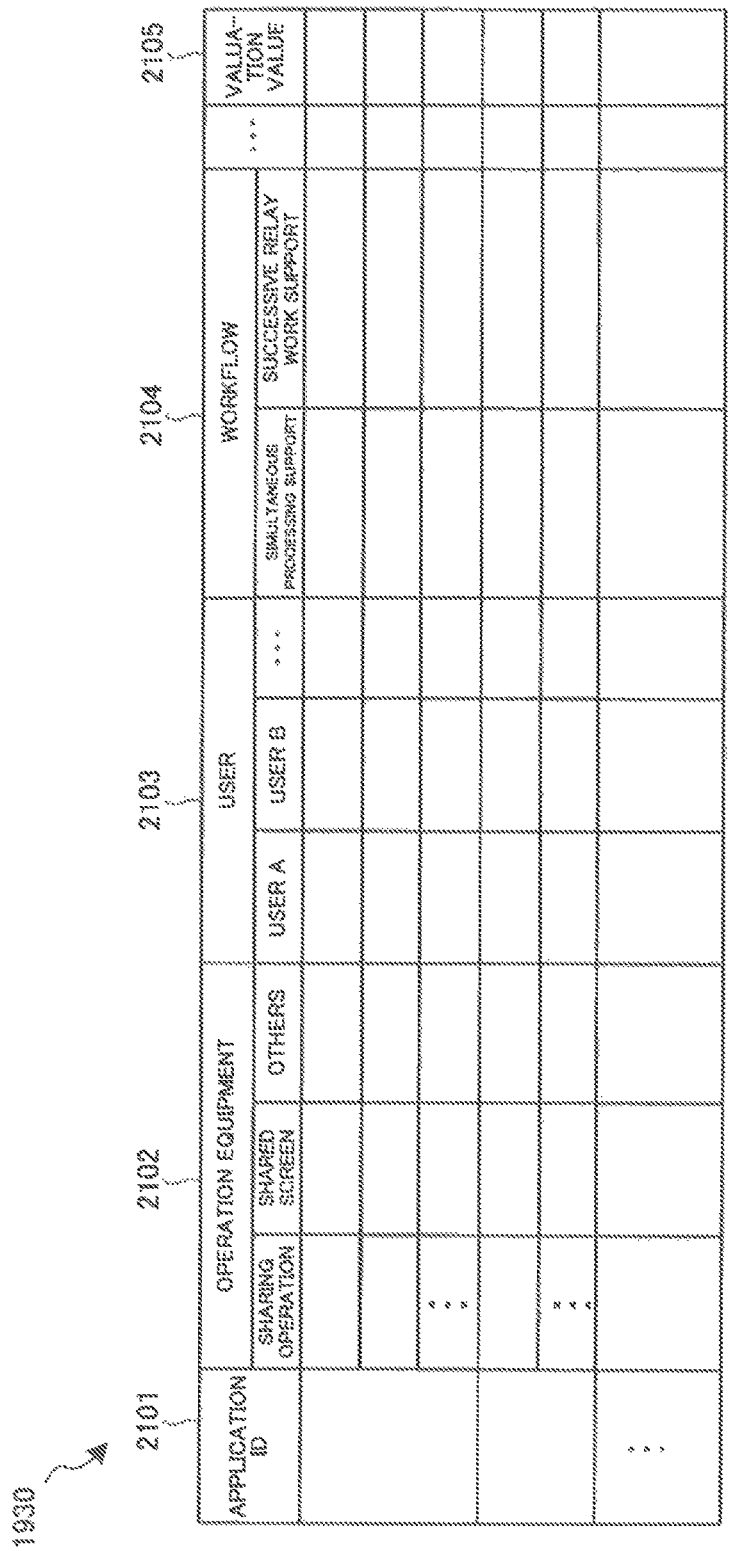
FIG. 21 is a diagram illustrating a structure of a setting history database according to the sixth example embodiment of the present invention.

FIG. 21 is a diagram illustrating a structure of the workflow database 1930 according to the present example embodiment.

In association with an application ID 2101, the workflow database 1930 stores past operation equipment 2102, a past system user 2103, and a past workflow 2104. Further, the workflow database 1930 stores an evaluation value 2105 of the combination. A suitable workflow is used in accordance with the evaluation value 2105.

<<Workflow Processing Procedure>>

Figure 22:
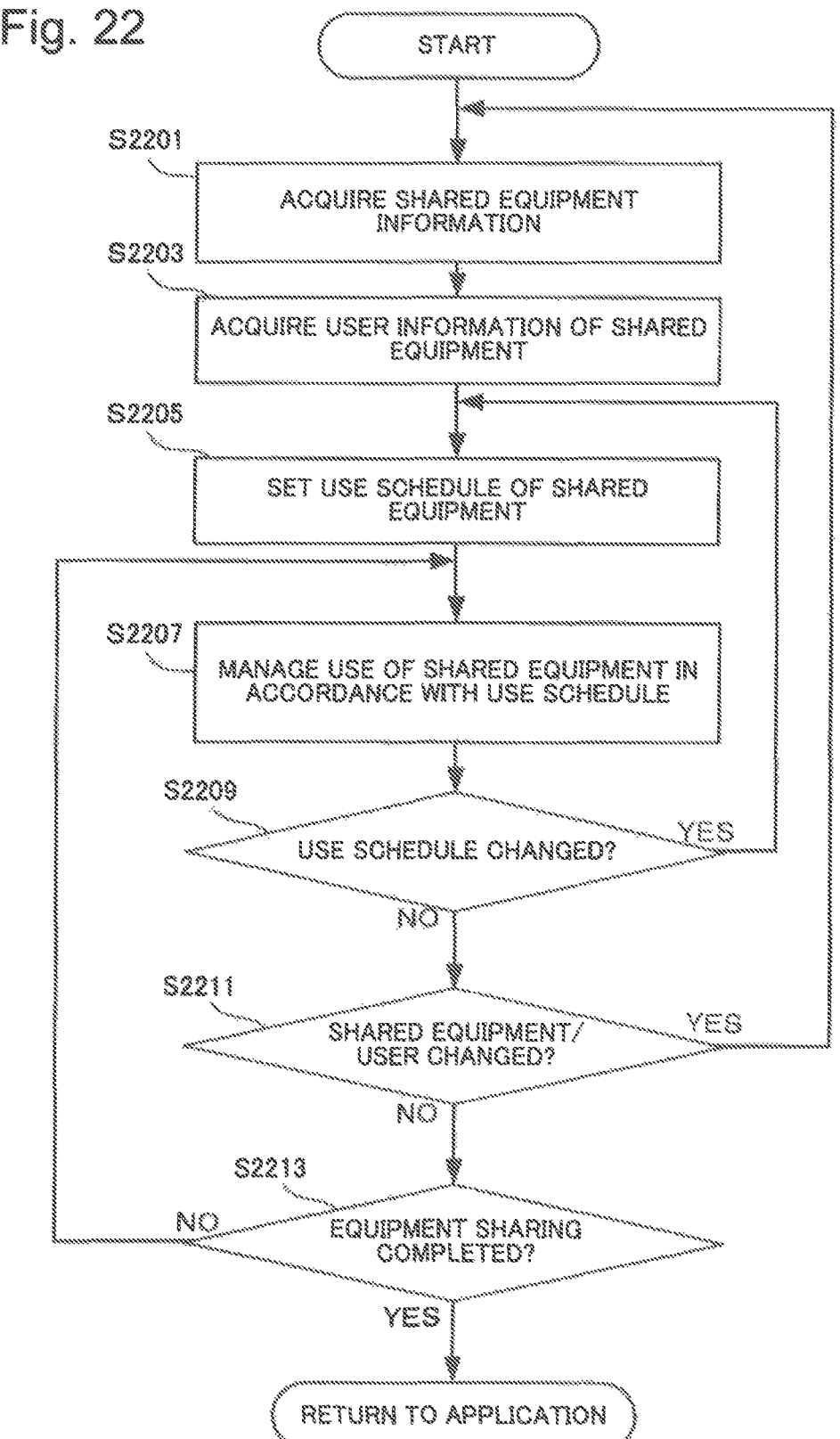
FIG. 22 is a flowchart illustrating a processing procedure of a workflow according to the sixth example embodiment of the present invention.

FIG. 22 is a flowchart illustrating a processing procedure of a workflow according to the present example embodiment. The workflow is an example of a use schedule of shared equipment. While the flowchart may be performed by the information processing device, it is basically desirable that the flowchart be performed by a cloud server.

In Step S2201, a cloud server acquires shared equipment information. Next, in Step S2203, the cloud server acquires user information of the shared equipment. Then, in Step S2205, the cloud server sets a use schedule of the shared equipment.

In Step S2207, the cloud server manages use of the shared equipment in accordance with the use schedule. In Step S2209, the cloud server determines whether or not the use schedule is changed. When the use schedule is changed, the cloud server returns to Step S2205 to set a new use schedule and continue the processing.

When the use schedule is not changed, in Step S2211, the cloud server determines whether or not the shared equipment or the user is changed. When the shared equipment or the user is changed, the cloud server returns to Step S2201 to acquire new shared equipment or a new user and continue the processing.

When the shared equipment and the user are not changed, in Step S2213, the cloud server determines whether or not the equipment sharing is completed. When the equipment sharing is not completed, the cloud server returns to Step S2207 to continue management of use of the shared equipment in accordance with the use schedule.

The present example embodiment is able to suitably control sharing operation in a use schedule of shared equipment and the like, and save and reuse the workflow.

Seventh Example Embodiment

Next, an information processing system according to a seventh example embodiment of the present invention will be described. The information processing system according to the present example embodiment differs from the aforementioned second to sixth example embodiments in that different types of data are communicated between an information processing device 230 (virtual PC) and a communication terminal 220 connected to a device. That is to say, according to the present example embodiment, an application IF in the information processing device 230 and a host controller IF In the communication terminal 220 are separated at parts different from the second example embodiment. For example, when an entire device driver including a host controller chip (HC) is provided by software, a set of a host controller driver and a host controller chip in particular is separated in various layers in consideration of communication efficiency and a communication rate. Then, information between separated layers is designed to be communicated through a network between the information processing device 230 and the communication terminal 220. The remaining configuration and operation are similar to the second to sixth example embodiments, and therefore a same configuration and a same operation are respectively given same reference signs, and detailed description thereof is omitted.

(Data Transmission Example)

Figure 23:
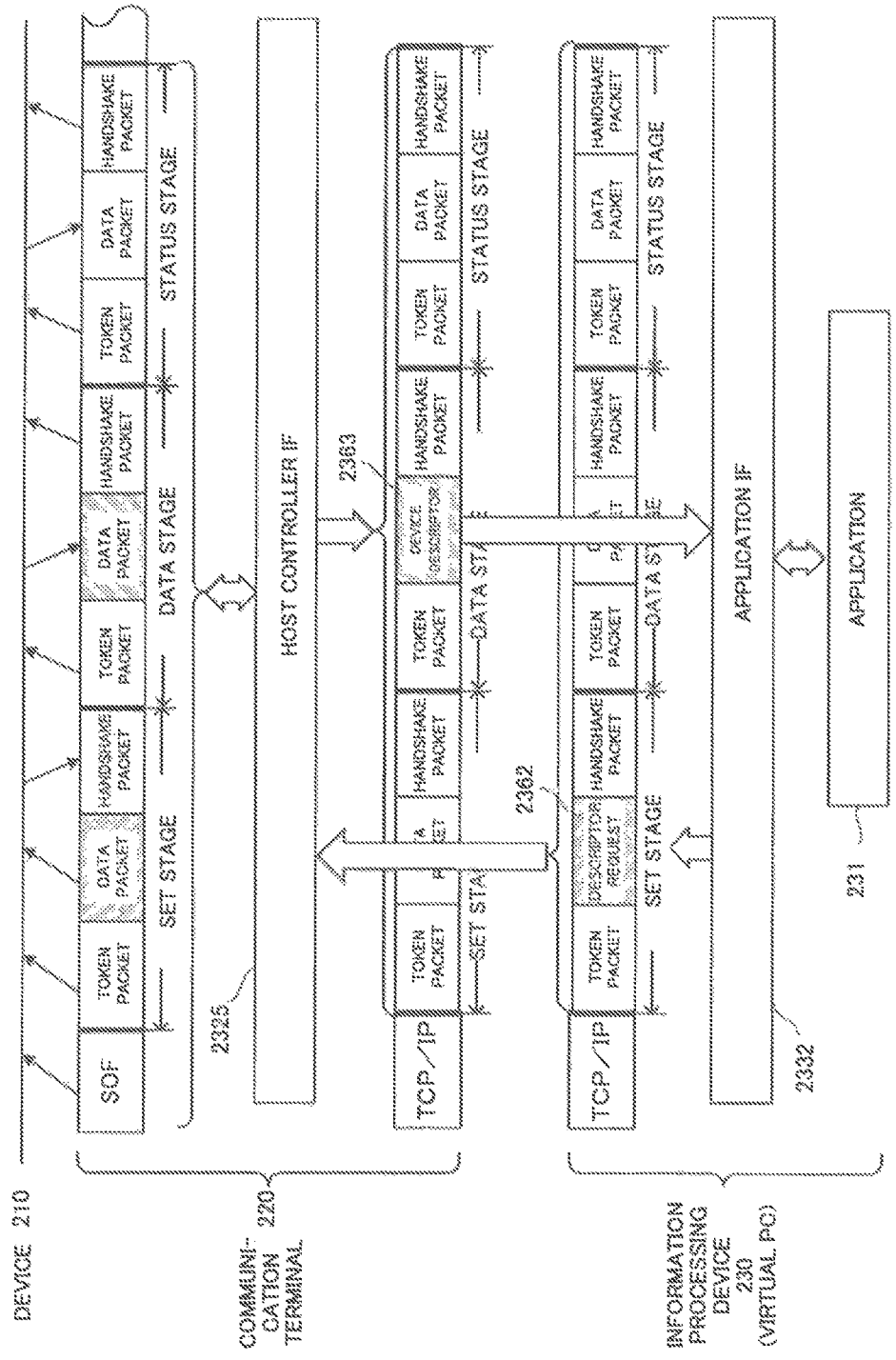
FIG. 23 is a diagram illustrating data transmission in an information processing system according to a seventh example embodiment of the present invention.

FIG. 23 is a diagram illustrating data transmission in the information processing system according to the present example embodiment. Similarly to FIG. 2G, FIG. 23 is a diagram illustrating a descriptor acquisition procedure of a USB-connected USB device. Accordingly, in FIG. 23, a same reference sign is given to a component similar to a component in FIG. 2G, and description thereof is omitted.

A descriptor set to a device 210 is acquired by a USB request such as GET_DESCRIPTOR, A frame including a USB protocol of a USB request being a control transfer is exchanged between the information processing device 230 and the device 210. Each control transfer is composed of a setup stage, a data stage, and a status stage. Each stage is composed of a token packet, a data packet, and a handshake packet. A descriptor is acquired in a data packet in each data stage. A descriptor acquired from the device 210 is inserted into a frame IP encapsulated by an IP header and a TCP header, and is transmitted from a mobile terminal 220 to the information processing device 230.

In response to a device input-output request by an application 231, an application interface 2332 in the information processing device 230 first generates a frame including a USB protocol of a USB request GET DESCRIPTOR. Then, the application interface 2332 passes the frame to a communication control unit 401, in order to check a connected device.

The frame including the USB request GET DESCRIPTOR IP encapsulated by an IP header and a TCP header is received and IP decapsulated by a communication control unit 501 in the communication terminal 220. The USB request GET DESCRIPTOR is passed to a host controller interface 2325. The host controller interface 2325 instructs a USB hub interface 226 (unillustrated) to transfer each packet to the device 210 over a USB bus, in accordance with the frame including the USB protocol of the USB request GET DESCRIPTOR.

The host controller interface 2325 passes a frame including, as a device descriptor 2363, a data packet received from the device 210 in a data stage to the communication control unit 501. The frame including the device descriptor 2363 IP encapsulated by an IP header and a TCP header is transmitted from the communication control unit 501 in the communication terminal 220 to the communication control unit 401 in the information processing device 230

When the communication control unit 401 in the information processing device passes a frame including the decapsulated device descriptor 2363 to the application interface 2332, the application interface 2332 makes notification of connected device information in response to the device input-output request by the application 231.

Similar data transmission is subsequently performed in another control transfer, a bulk transfer, an interrupt transfer, and an isochronous transfer. The host controller interface 2325 and the USB bus interface 226 may be integrated into one piece of software.

FIG. 24 is a diagram illustrating another type of data transmission in the information processing system according to the present example embodiment. Similarly to FIGS. 2G and 23, FIG. 24 is a diagram illustrating a descriptor acquisition procedure of a USB-connected USB device. Accordingly, in FIG. 24, a same reference sign is given to a component similar to a component in FIGS. 2G and 23, and description thereof is omitted.

A descriptor set to a device 210 is acquired by a USB request such as GET_DESCRIPTOR. A control transfer including a USB protocol of a USB request is composed of a setup stage, a data stage, and a status stage. Each stage is composed of a token packet, a data packet, and a handshake packet. The setup stage including a USB protocol of a USB request being a control transfer, the data stage, and the status stage are respectively exchanged between an information processing device 230 and the device 210. A descriptor is acquired in a data packet in each data stage. A descriptor acquired from the device 210 is inserted into a data stage IP encapsulated by an IP header and a TCP header, and is transmitted from a mobile terminal 220 to the information processing device 230.

In response to a device input-output request by an application 231, an application interface 2432 in the information processing device 230 first generates a setup stage including a USB protocol of a USB request GET DESCRIPTOR. Then, the application interface 2432 passes the setup stage to a communication control unit 401, in order to check a connected, device.

The setup stage including the USB request GET DESCRIPTOR IP encapsulated by an IP header and a TCP header is received and IP decapsulated by a communication control unit 501 in the communication terminal 220. The USB request GET DESCRIPTOR is passed to a host controller interface 2425. The host controller interface 2425 instructs a USB bus interface 226 (unillustrated) to transfer each packet to the device 210 over a USB bus, in accordance with the setup stage including the USB protocol of the USB request GET DESCRIPTOR.

The host controller interface 2425 passes a data stage including, as a device descriptor 2463, a data packet received from the device 210 in the data stage to the communication control unit 501. The data stage including the device descriptor 2463 IP encapsulated by an IP header and a TCP header is transmitted from the communication control unit 501 in the communication terminal 220 to the communication control unit 401 in the information processing device 230.

When the communication control unit 401 in the information processing device passes the data stage including the decapsulated device descriptor 2463 to the application interface 2432, the application interface 2432 makes notification of connected device information in response to the device input-output request by the application 231.

Further, the host controller interface 2425 passes a status stage including, as status data 2464, a data packet received from the device 210 in the status stage to the communication control unit 501. The status stage including the status data 2464 IP encapsulated by an IP header and a TCP header is transmitted from the communication control unit 501 in the communication terminal 220 to the communication control unit 401 in the information processing device 230.

When the communication control unit 401 in the information processing device passes the status stage including the decapsulated status data 2464 to the application interface 2432, the application interface 2432 makes notification of connected device information in response to the device input-output request by the application 231.

While the application interface 2432 does not make a determination of a handshake packet in the description above, the application interface 2432 may be configured to check a handshake packet in each stage.

Similar data transmission is subsequently performed in another control transfer, a bulk transfer, an interrupt transfer, and an isochronous transfer. The host controller interface 2425 and the USB bus interface 226 may be integrated into one piece of software.

Whether communication between an information processing device (virtual PC) and a communication terminal is communication separating the own drivers on a frame-by-frame basis or on a stage-by-stage basis, the present example embodiment enables a USB device connected to the remote communication terminal to be operated in a same manner as a USB device directly connected to the information processing device.

Other Example Embodiments

While examples of device connection by USB and HDMI (registered trademark) according to the aforementioned example embodiments have been described, another type of connection, such as SCSI provides a similar effect. Additionally, the aforementioned example embodiments may be applied to a case that a device is connected by short-distance wireless communication such as infrared communication, WiFi, and Bluetooth (registered trademark) to provide a similar effect.

Further, while the present invention has been described with reference to the example embodiments, the present invention is not limited to the aforementioned example embodiments. Various changes and modifications that can be understood by a person skilled in the art may be made to the configurations and details of the present invention, within the scope of the present invention. Further, a system or a device in which different features included in the respective example embodiments are appropriately combined is also included in the scope of the present invention.

Further, the present invention may be applied to a system composed of a plurality of pieces of equipment or a single device. Additionally, the present invention is applicable when an information processing program providing a function according to the example embodiments is supplied to a system or a device directly or remotely. Accordingly, a program installed on a computer for providing a function of the present invention by the computer, a medium storing the program, and a World Wide Web (WWW) server for downloading the program are also included in the scope of the present invention. At least a non-transitory computer readable medium storing a program that causes a computer to perform processing steps included in the aforementioned example embodiments, in particular, is included in the scope of the present invention.

This application is related to Japanese Patent Applications (Japanese Patent Application No. 2014-235108, Japanese Patent Application No. 2014-235109, and Japanese Patent Application No. 2014-235111) filed on the same day, the disclosure of which is hereby incorporated by reference thereto in its entirety.

This application claims priority based on Japanese Patent Application No. 2014-235110 filed on Nov. 19, 2014, the disclosure of which is hereby Incorporated by reference thereto in its entirety.

The invention claimed is:

1. An information processing system comprising:
a plurality of operation devices respectively connected to a plurality of communication terminals;
one or more processors acting as an operation integration unit configured to input information about an operation on the plurality of operation devices;
a display device that has a communication function; the one or more processors acting as a control unit configured to control generation of a screen related to information about an operation from the plurality of operation devices;
the one or more processors acting as a display control unit configured to cause the display device to display the screen, wherein the one or more processors acting as the display control unit includes:
a display sharing unit configured to cause a plurality of display devices having a communication function to display the screen,
wherein the communication terminals include:
the one or more processors acting as a device control unit configured to control a connected device; and
a device interface configured to interface with the device control unit,
an information processing device configured to communicate with at least one of the communication terminals or the communication function, wherein the information processing device includes an application;
the one or more processors acting as the operation integration unit configured to input, under the application, the operation on the plurality of operation devices;
the one or more processors acting as the control unit configured to control, under the application, the screen to be displayed; and
the display sharing unit configured to cause, under the application, the plurality of display devices to display the screen;
a communication buffer for adjusting a communication band between the information processing device and the communication terminals; and
the one or more processors acting as a synchronization unit configured to synchronize the operation on the plurality of operation devices and the display of the plurality of display devices, by adjusting a capacity of the communication buffer.

2. The information processing system according to claim 1, wherein the operation integration unit includes a class driver for at least one of the operation devices, and bus drivers for the operation devices, cooperating with the class driver for the at least one of the operation devices, wherein a number of the bus drivers for the operation devices corresponds to a number of the operation devices, and
the display sharing unit includes a class driver for the display device, and bus drivers for the plurality of display devices, cooperating with the class driver for the display device, wherein a number of the bus drivers for the display devices corresponds to a number of the display devices.

3. The information processing system according to claim 2, further comprising setting storage that stores settings of at least one of the operation devices and a device driver thereof, and settings of the display device and a device driver thereof.

4. The information processing system according to claim 1, wherein the information processing device is a virtual personal computer (PC) on a cloud server, and the display sharing unit causes sharing of a display of an image generated by a graphic accelerator included in the information processing device or the display device.

5. The information processing system according to claim 4, further comprising setting storage that stores settings of at least one of the operation devices and a device driver thereof, and settings of the display device and a device driver thereof.

6. The information processing system according to claim 1, further comprising setting storage that stores settings of at least one of the operation devices and a device driver thereof, and settings of the display device and a device driver thereof.

7. The information processing system according to claim 6, wherein the setting storage further stores a communication setting and a capacity of the communication buffer for adjusting the communication band.

8. The information processing system according to claim 1, further comprising the one or more processors acting as a compression unit configured to compress communication data of the display device when a communication capacity of a device connected to the communication terminal exceeds the communication band.

9. The information processing system according to claim 1, further comprising communication unit that connects a device shared by a plurality of users through a communication path being independent of a communication path of at least one of the operation devices and a communication path of the display device.

10. The information processing system according to claim 1, further comprising: the one or more processors acting as an execution unit configured to execute, as middleware, a workflow supporting, in accordance with status of a device connected to the communication terminal, work using the device; and workflow storage that stores the workflow in a searchable manner.

11. An information processing method comprising:
inputting information about an operation on a plurality of operation devices respectively connected to a plurality of communication terminals, wherein the communication terminals include:
a device control unit configured to control a connected device; and
a device interface configured to interface with the device control unit;
controlling generation of a screen related to information about an operation from the plurality of operation devices;
causing a display device having a communication function to display the screen;
causing a plurality of display devices to display the screen;
communicating with at least one of the communication terminals or the communication function;
inputting, under an application of an information processing device, an operation on the plurality of operation devices;
controlling, under the application, the screen to be displayed;
causing, under the application, the plurality of display devices to display the screen;
adjusting a communication band between an information processing device and the communication terminals; and
synchronizing the operation on the plurality of operation devices and a display of a plurality of display devices, by adjusting a capacity of a communication butter.

12. An information processing device comprising:
one or more processors acting as an operation integration unit configured to receive information about an operation on a plurality of operation devices respectively connected to a plurality of communication terminals;
the one or more processors acting as a control unit configured to control generation of a screen related to information about an operation from the plurality of operation devices;
the one or more processors acting as a display control unit configured to cause a display device having a communication function to display the screen, wherein the one or more processors acting as the display control unit includes:
a display sharing unit configured to cause a plurality of display devices to display the screen, wherein the communication terminals include:
the one or more processors acting as a device control unit configured to control a connected device; and
a device interface configured to interface with the device control unit, an information processing device configured to communicate with at least one of the communication terminals or the communication function, wherein the information processing device includes:
an application; the one or more processors acting as the operation integration unit configured to input, under the application, the operation on the plurality of operation devices;
the one or more processors acting as the control unit configured to control, under the application, the screen to be displayed; and
the display sharing unit configured to cause, under the application, the plurality of display devices to display the screen;
a communication buffer for adjusting a communication band between the information processing device and the communication terminals; and
the one or more processors acting as a synchronization unit configured to synchronize the operation on the plurality of operation devices and the display of the plurality of display devices, by adjusting a capacity of the communication buffer.

* * * * *